United States Patent
Gharavi et al.

(10) Patent No.: US 10,944,467 B2
(45) Date of Patent: *Mar. 9, 2021

(54) RECONFIGURABLE AND MODULAR ACTIVE REPEATER DEVICE

(71) Applicant: Movandi Corporation, Irvine, CA (US)

(72) Inventors: Sam Gharavi, Irvine, CA (US);
Ahmadreza Rofougaran, Newport Beach, CA (US); Michael Boers, South Turramurra (AU); Seunghwan Yoon, Irvine, CA (US); Kartik Sridharan, San Diego, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: SILICON VALLEY BANK, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,470

(22) Filed: Jul. 13, 2020

(65) Prior Publication Data

US 2020/0343963 A1 Oct. 29, 2020

Related U.S. Application Data

(63) Continuation of application No. 16/526,544, filed on Jul. 30, 2019, now Pat. No. 10,819,415, which is a
(Continued)

(51) Int. Cl.
*H04B 7/15* (2006.01)
*H04L 5/14* (2006.01)
(Continued)

(52) U.S. Cl.
CPC ....... *H04B 7/15514* (2013.01); *H04B 7/0413* (2013.01); *H04B 7/0617* (2013.01);
(Continued)

(58) Field of Classification Search
CPC ...... H04B 17/318; H04B 7/0413; H04B 7/15; H04B 7/0617; H04B 7/15514;
(Continued)

(56) References Cited

U.S. PATENT DOCUMENTS 2,579,324 A 12/1951 Kock
2,652,189 A 9/1953 Gorman
(Continued)

FOREIGN PATENT DOCUMENTS

EP 1890441 A2 2/2008
EP 1890441 A3 3/2013
(Continued)

OTHER PUBLICATIONS

Notice of Allowance for U.S. Appl. No. 16/382,386 dated Jul. 24, 2019.
(Continued)

*Primary Examiner* — Syed Haider
(74) *Attorney, Agent, or Firm* — Chip Law Group

(57) ABSTRACT

An active repeater device includes a primary sector and one or more secondary sectors, receives a first beam of input RF signals. A first set of analog baseband signals, are generated based on received first beam of input RF signals. The first set of analog baseband signals are converted to a first set of coded data signals and control information is extracted from the first set of coded data signals by decoding only a header portion of the first set of coded data signals without demodulation of data portion of the first set of coded data signals. Based on the extracted control information, the first set of coded data signals are transmitted as beams of output RF
(Continued)

signals to remote user equipment. The transmission is independent of demodulation of the data portion within the active repeater device to reduce latency for transmission of the first set of coded data signals.

28 Claims, 14 Drawing Sheets

Related U.S. Application Data continuation of application No. 16/031,007, filed on Jul. 10, 2018, now Pat. No. 10,484,078.

(60) Provisional application No. 62/531,161, filed on Jul. 11, 2017.

(51) Int. Cl.
| | | |
|---|---|---|
| *H04B 7/155* | (2006.01) | |
| *H04B 7/204* | (2006.01) | |
| *H04B 7/165* | (2006.01) | |
| *H04W 52/24* | (2009.01) | |
| *H04B 7/06* | (2006.01) | |
| *H04B 17/318* | (2015.01) | |
| *H04B 7/0413* | (2017.01) | |
| *H04W 52/46* | (2009.01) | |
| *H04L 5/00* | (2006.01) | |

(52) U.S. Cl.
CPC ............ *H04B 7/15* (2013.01); *H04B 7/1555* (2013.01); *H04B 7/165* (2013.01); *H04B 7/2041* (2013.01); *H04B 17/318* (2015.01); *H04W 52/245* (2013.01); *H04W 52/46* (2013.01); *H04L 5/0023* (2013.01); *H04L 5/14* (2013.01)

(58) Field of Classification Search
CPC .... H04B 7/2041; H04B 7/165; H04B 7/1555; H04L 5/14; H04L 5/0023; H04W 52/245; H04W 52/46
See application file for complete search history.

(56) References Cited

U.S. PATENT DOCUMENTS

| | | |
|---|---|---|
| 3,618,097 A | 11/1971 | Mcleod, Jr. |
| 3,835,469 A | 9/1974 | Chen et al. |
| 3,836,973 A | 9/1974 | Shnitkin et al. |
| 4,380,013 A | 4/1983 | Slysh |
| 4,739,334 A | 4/1988 | Soref |
| 4,827,276 A | 5/1989 | Fukuzawa et al. |
| 4,829,314 A | 5/1989 | Barbier et al. |
| 5,473,602 A | 12/1995 | McKenna et al. |
| 5,479,651 A | 12/1995 | Nakaguchi |
| 5,525,990 A | 6/1996 | Lewis |
| 5,561,850 A | 10/1996 | Makitalo et al. |
| 5,598,173 A | 1/1997 | Forti et al. |
| 5,666,124 A | 9/1997 | Chethik et al. |
| 5,771,017 A | 6/1998 | Dean et al. |
| 5,883,602 A | 3/1999 | Volman |
| 5,905,473 A | 5/1999 | Taenzer |
| 5,936,577 A | 8/1999 | Shoki et al. |
| 5,936,588 A | 8/1999 | Rao et al. |
| 5,940,033 A | 8/1999 | Locher et al. |
| 6,018,316 A | 1/2000 | Rudish et al. |
| 6,297,774 B1 | 10/2001 | Chung |
| 6,307,502 B1 | 10/2001 | Marti-Canales et al. |
| 6,307,507 B1 | 10/2001 | Gross et al. |
| 6,329,649 B1 | 12/2001 | Jack et al. |
| 6,405,018 B1 | 6/2002 | Reudink et al. |
| 6,433,920 B1 | 8/2002 | Welch et al. |
| 6,456,252 B1 | 9/2002 | Goyette |
| 6,487,417 B1 | 11/2002 | Rossoni et al. |
| 6,577,631 B1 | 6/2003 | Keenan et al. |
| 6,600,776 B1 | 7/2003 | Alamouti et al. |
| 6,678,430 B1 | 1/2004 | Noe et al. |
| 6,718,159 B1 | 4/2004 | Sato |
| 6,802,035 B2 | 10/2004 | Catreux et al. |
| 6,804,491 B1 | 10/2004 | Uesugi |
| 6,808,237 B2 | 10/2004 | Schmid et al. |
| 6,891,511 B1 | 5/2005 | Angelucci |
| 6,911,956 B2 | 6/2005 | Miyata |
| 6,992,622 B1 | 1/2006 | Chiang et al. |
| 7,020,482 B2 | 3/2006 | Medvedev et al. |
| 7,058,367 B1 | 6/2006 | Luo et al. |
| 7,079,079 B2 | 7/2006 | Jo et al. |
| 7,170,442 B2 | 1/2007 | Lovberg et al. |
| 7,187,949 B2 | 3/2007 | Chang et al. |
| 7,206,294 B2 | 4/2007 | Garahi et al. |
| 7,248,217 B2 | 7/2007 | Mani et al. |
| 7,248,841 B2 | 7/2007 | Agee et al. |
| 7,260,141 B2 | 8/2007 | Bierly et al. |
| 7,333,455 B1 | 2/2008 | Bolt et al. |
| 7,339,979 B1 | 3/2008 | Kelkar |
| 7,363,058 B2 | 4/2008 | Gustaf |
| 7,424,225 B1 | 9/2008 | Elliott |
| 7,574,236 B1 | 8/2009 | Mansour |
| 7,636,573 B2 | 12/2009 | Walton et al. |
| 7,664,193 B2 | 2/2010 | Jalali et al. |
| 7,688,909 B2 | 3/2010 | Tsutsui |
| 7,689,216 B2 | 3/2010 | Wandel |
| 7,710,319 B2 | 5/2010 | Nassiri-Toussi et al. |
| 7,729,445 B2 | 6/2010 | Ravi et al. |
| 7,890,114 B2 | 2/2011 | Braun et al. |
| 7,904,117 B2 | 3/2011 | Doan et al. |
| 7,911,985 B2 | 3/2011 | Proctor, Jr. et al. |
| 7,920,889 B2 | 4/2011 | Hoshino et al. |
| 7,982,555 B2 | 7/2011 | Rofougaran |
| 7,986,742 B2 | 7/2011 | Ketchum et al. |
| 8,014,366 B2 | 9/2011 | Wax et al. |
| 8,098,752 B2 | 1/2012 | Hwang et al. |
| 8,102,325 B2 | 1/2012 | Feller et al. |
| 8,121,235 B1 | 2/2012 | Sun et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,175,184 B2 | 5/2012 | Kim et al. |
| 8,190,102 B2 | 5/2012 | Rofougaran |
| 8,203,978 B2 | 6/2012 | Walton et al. |
| 8,228,188 B2 | 7/2012 | Key et al. |
| 8,274,443 B2 | 9/2012 | Hauhe et al. |
| 8,279,132 B2 | 10/2012 | Jung et al. |
| 8,280,445 B2 | 10/2012 | Yong et al. |
| 8,290,086 B2 | 10/2012 | Bose et al. |
| 8,314,736 B2 | 11/2012 | Moshfeghi |
| 8,320,304 B2 | 11/2012 | Deb et al. |
| 8,364,188 B2 | 1/2013 | Srinivasan et al. |
| 8,369,791 B2 | 2/2013 | Hafeez |
| 8,385,305 B1 | 2/2013 | Negus et al. |
| 8,385,452 B2 | 2/2013 | Gorokhov |
| 8,396,157 B2 | 3/2013 | Li et al. |
| 8,457,798 B2 | 6/2013 | Hackett |
| 8,462,047 B1 | 6/2013 | Ai et al. |
| 8,482,462 B2 | 7/2013 | Komijani et al. |
| 8,570,988 B2 | 10/2013 | Wallace et al. |
| 8,588,193 B1 | 11/2013 | Ho et al. |
| 8,589,003 B2 | 11/2013 | Brand et al. |
| 8,618,983 B2 | 12/2013 | Chen et al. |
| 8,620,301 B1 | 12/2013 | Hessel |
| 8,644,262 B1 | 2/2014 | Sun et al. |
| 8,654,815 B1 | 2/2014 | Forenza et al. |
| 8,744,513 B2 | 6/2014 | Chen et al. |
| 8,750,264 B2 | 6/2014 | Shatti |
| 8,780,943 B2 | 7/2014 | Moshfeghi |
| 8,787,469 B2 | 7/2014 | Kim et al. |
| 8,817,678 B2 | 8/2014 | Moshfeghi |
| 8,854,255 B1 | 10/2014 | Ehret |
| 8,885,628 B2 | 11/2014 | Palanki et al. |
| 9,037,094 B2 | 5/2015 | Moshfeghi |
| 9,065,515 B2 | 6/2015 | Pezennec et al. |
| 9,112,648 B2 | 8/2015 | Moshfeghi |
| 9,130,262 B2 | 9/2015 | Park et al. |

(56) References Cited

U.S. PATENT DOCUMENTS

| | | |
|---|---|---|
| 9,137,067 B1 | 9/2015 | Xie et al. |
| 9,185,601 B2 | 11/2015 | Frerking et al. |
| 9,197,465 B2 | 11/2015 | Ma et al. |
| 9,197,982 B2 | 11/2015 | Moshfeghi |
| 9,225,482 B2 | 12/2015 | Moshfeghi |
| 9,226,092 B2 | 12/2015 | Moshfeghi |
| 9,231,311 B2 | 1/2016 | Tiezzi et al. |
| 9,252,908 B1 | 2/2016 | Branlund |
| 9,253,587 B2 | 2/2016 | Moshfeghi |
| 9,438,389 B2 | 9/2016 | Moshfeghi et al. |
| 9,456,354 B2 | 9/2016 | Branlund |
| 9,537,214 B2 | 1/2017 | Corman et al. |
| 9,548,805 B2 | 1/2017 | Moshfeghi et al. |
| 9,602,257 B2 | 3/2017 | Moshfeghi et al. |
| 9,620,464 B2 | 4/2017 | Baks et al. |
| 9,638,795 B2 | 5/2017 | Ahmed |
| 9,660,777 B2 | 5/2017 | Moshfeghi et al. |
| 9,680,554 B2 | 6/2017 | Moshfeghi et al. |
| 9,686,060 B2 | 6/2017 | Moshfeghi |
| 9,692,489 B1 | 6/2017 | Rofougaran et al. |
| 9,698,948 B2 | 7/2017 | Moshfeghi |
| 9,722,322 B2 | 8/2017 | Bertin et al. |
| 9,736,637 B2 | 8/2017 | Larsen et al. |
| 9,742,367 B2 | 8/2017 | Mirzaei et al. |
| 9,780,928 B2 | 10/2017 | Moshfeghi et al. |
| 9,787,103 B1 | 10/2017 | Leabman et al. |
| 9,819,410 B1 | 11/2017 | Azevedo et al. |
| 9,829,563 B2 | 11/2017 | Xiao et al. |
| 9,923,620 B2 | 3/2018 | Moshfeghi et al. |
| 10,020,861 B2 | 7/2018 | Moshfeghi et al. |
| 10,069,555 B2 | 9/2018 | Islam et al. |
| 10,069,608 B2 | 9/2018 | Moshfeghi et al. |
| 10,084,576 B2 | 9/2018 | Moshfeghi et al. |
| 10,090,887 B1 | 10/2018 | Rofougaran et al. |
| 10,103,853 B2 | 10/2018 | Moshfeghi |
| 10,199,717 B2 | 2/2019 | Rofougaran et al. |
| 10,277,370 B2 | 4/2019 | Moshfeghi |
| 10,320,090 B2 | 6/2019 | Zou et al. |
| 10,348,371 B2 | 7/2019 | Rofougaran et al. |
| 10,560,179 B2 | 2/2020 | Gharavi et al. |
| 10,587,313 B2 | 3/2020 | Yoon et al. |
| 10,666,326 B2 | 5/2020 | Rofougaran et al. |
| 2002/0034958 A1 | 3/2002 | Oberschmidt et al. |
| 2002/0132600 A1 | 9/2002 | Rudrapatna |
| 2002/0165001 A1 | 11/2002 | Phillips et al. |
| 2002/0193074 A1 | 12/2002 | Squibbs |
| 2002/0196186 A1 | 12/2002 | Holt |
| 2003/0012208 A1 | 1/2003 | Bernheim et al. |
| 2003/0090418 A1 | 5/2003 | Howell |
| 2003/0122724 A1 | 7/2003 | Shelley et al. |
| 2003/0125040 A1 | 7/2003 | Walton et al. |
| 2003/0129989 A1 | 7/2003 | Gholmieh et al. |
| 2003/0236109 A1 | 12/2003 | Nagata |
| 2004/0077354 A1 | 4/2004 | Jason et al. |
| 2004/0077379 A1 | 4/2004 | Smith et al. |
| 2004/0080455 A1 | 4/2004 | Lee |
| 2004/0082356 A1 | 4/2004 | Walton et al. |
| 2004/0095907 A1 | 5/2004 | Agee et al. |
| 2004/0110469 A1 | 6/2004 | Judd et al. |
| 2004/0116129 A1 | 6/2004 | Wilson |
| 2004/0127174 A1 | 7/2004 | Frank et al. |
| 2004/0166808 A1 | 8/2004 | Hasegawa et al. |
| 2004/0196184 A1 | 10/2004 | Hollander et al. |
| 2004/0204114 A1 | 10/2004 | Brennan et al. |
| 2005/0048964 A1 | 3/2005 | Cohen et al. |
| 2005/0069252 A1 | 3/2005 | Hwang et al. |
| 2005/0088358 A1 | 4/2005 | Larry et al. |
| 2005/0134517 A1 | 6/2005 | Gottl |
| 2005/0136943 A1 | 6/2005 | Banerjee et al. |
| 2005/0181755 A1 | 8/2005 | Hoshino et al. |
| 2005/0205720 A1 | 9/2005 | Peltz et al. |
| 2005/0232216 A1 | 10/2005 | Webster et al. |
| 2005/0237971 A1 | 10/2005 | Skraparlis |
| 2005/0243756 A1 | 11/2005 | Cleveland et al. |
| 2005/0270227 A1 | 12/2005 | Stephens |
| 2006/0025178 A1 | 2/2006 | Tao et al. |
| 2006/0063494 A1 | 3/2006 | Zhang et al. |
| 2006/0121946 A1 | 6/2006 | Walton et al. |
| 2006/0128336 A1 | 6/2006 | Waltman et al. |
| 2006/0170595 A1 | 8/2006 | Gustaf |
| 2006/0246922 A1 | 11/2006 | Gasbarro et al. |
| 2006/0267839 A1 | 11/2006 | Vaskelainen et al. |
| 2006/0273959 A1 | 12/2006 | Kawasaki |
| 2007/0001924 A1 | 1/2007 | Hirabayashi |
| 2007/0040025 A1 | 2/2007 | Goel et al. |
| 2007/0052519 A1 | 3/2007 | Talty et al. |
| 2007/0066254 A1 | 3/2007 | Tsuchie et al. |
| 2007/0093270 A1 | 4/2007 | Lagnado |
| 2007/0100548 A1 | 5/2007 | Small |
| 2007/0115800 A1 | 5/2007 | Fonseka et al. |
| 2007/0116012 A1 | 5/2007 | Chang et al. |
| 2007/0127360 A1 | 6/2007 | Song et al. |
| 2007/0160014 A1 | 7/2007 | Larsson |
| 2007/0280310 A1 | 12/2007 | Muenter et al. |
| 2008/0025208 A1 | 1/2008 | Chan |
| 2008/0026763 A1 | 1/2008 | Rensburg et al. |
| 2008/0076370 A1 | 3/2008 | Kotecha et al. |
| 2008/0100504 A1 | 5/2008 | Martin et al. |
| 2008/0117961 A1 | 5/2008 | Han et al. |
| 2008/0163693 A1 | 7/2008 | Sfez et al. |
| 2008/0166975 A1 | 7/2008 | Kim et al. |
| 2008/0167049 A1 | 7/2008 | Karr et al. |
| 2008/0212582 A1 | 9/2008 | Zwart et al. |
| 2008/0225758 A1 | 9/2008 | Proctor et al. |
| 2008/0258993 A1 | 10/2008 | Gummalla et al. |
| 2008/0261509 A1 | 10/2008 | Sen |
| 2008/0303701 A1 | 12/2008 | Zhang et al. |
| 2008/0305820 A1 | 12/2008 | Sadiq et al. |
| 2008/0309555 A1 | 12/2008 | Fan et al. |
| 2008/0315944 A1 | 12/2008 | Brown |
| 2009/0009392 A1 | 1/2009 | Jacomb-Hood et al. |
| 2009/0010215 A1 | 1/2009 | Kim et al. |
| 2009/0028120 A1 | 1/2009 | Lee |
| 2009/0029645 A1 | 1/2009 | Leroudier |
| 2009/0093265 A1 | 4/2009 | Kimura et al. |
| 2009/0136227 A1 | 5/2009 | Lambert |
| 2009/0156227 A1 | 6/2009 | Frerking et al. |
| 2009/0161235 A1 | 6/2009 | Border et al. |
| 2009/0175214 A1* | 7/2009 | Sfar .............. H04B 7/026 370/315 |
| 2009/0195455 A1 | 8/2009 | Kim et al. |
| 2009/0224137 A1 | 9/2009 | Hoermann |
| 2009/0233545 A1 | 9/2009 | Sutskover et al. |
| 2009/0296846 A1 | 12/2009 | Maru |
| 2009/0315797 A1 | 12/2009 | Rofougaran et al. |
| 2009/0325479 A1 | 12/2009 | Chakrabarti et al. |
| 2010/0042881 A1 | 2/2010 | Wong |
| 2010/0046655 A1 | 2/2010 | Lee et al. |
| 2010/0074367 A1 | 3/2010 | Kim et al. |
| 2010/0080197 A1 | 4/2010 | Kanellakis et al. |
| 2010/0090898 A1 | 4/2010 | Gallagher et al. |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0136922 A1 | 6/2010 | Rofougaran |
| 2010/0149039 A1 | 6/2010 | Komijani et al. |
| 2010/0167639 A1 | 7/2010 | Ranson et al. |
| 2010/0172309 A1 | 7/2010 | Forenza et al. |
| 2010/0208776 A1 | 8/2010 | Song et al. |
| 2010/0220012 A1 | 9/2010 | Reede |
| 2010/0225539 A1 | 9/2010 | Margomenos et al. |
| 2010/0261440 A1 | 10/2010 | Corman et al. |
| 2010/0265925 A1 | 10/2010 | Liu et al. |
| 2010/0266061 A1 | 10/2010 | Cheng et al. |
| 2010/0267415 A1 | 10/2010 | Kakitsu et al. |
| 2010/0273504 A1 | 10/2010 | Bull et al. |
| 2010/0284446 A1 | 11/2010 | Mu et al. |
| 2010/0291918 A1 | 11/2010 | Suzuki et al. |
| 2010/0304680 A1 | 12/2010 | Kuffner et al. |
| 2010/0304770 A1 | 12/2010 | Wietfeldt et al. |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0025432 A1 | 2/2011 | Gagnon et al. |

(56) References Cited

U.S. PATENT DOCUMENTS

| | | |
|---|---|---|
| 2011/0045764 A1 | 2/2011 | Maruyama et al. |
| 2011/0063181 A1 | 3/2011 | Walker |
| 2011/0069773 A1 | 3/2011 | Doron et al. |
| 2011/0081875 A1 | 4/2011 | Imamura et al. |
| 2011/0105032 A1 | 5/2011 | Maruhashi et al. |
| 2011/0105167 A1 | 5/2011 | Pan et al. |
| 2011/0136478 A1 | 6/2011 | Trigui |
| 2011/0140954 A1 | 6/2011 | Fortuny-Guasch |
| 2011/0142104 A1 | 6/2011 | Coldrey et al. |
| 2011/0149835 A1 | 6/2011 | Shimada et al. |
| 2011/0164510 A1 | 7/2011 | Zheng et al. |
| 2011/0187602 A1 | 8/2011 | Nair et al. |
| 2011/0190005 A1* | 8/2011 | Cheon .................. H04W 24/00 455/456.1 |
| 2011/0194504 A1 | 8/2011 | Gorokhov et al. |
| 2011/0212684 A1 | 9/2011 | Nam et al. |
| 2011/0222616 A1 | 9/2011 | Jiang et al. |
| 2011/0268037 A1 | 11/2011 | Fujimoto |
| 2011/0291891 A1 | 12/2011 | Nsenga et al. |
| 2011/0299441 A1 | 12/2011 | Petrovic et al. |
| 2012/0002742 A1 | 1/2012 | Cheng |
| 2012/0015603 A1 | 1/2012 | Proctor et al. |
| 2012/0034924 A1 | 2/2012 | Kalhan |
| 2012/0057508 A1 | 3/2012 | Moshfeghi |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083223 A1 | 4/2012 | Li et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0131650 A1 | 5/2012 | Gutt et al. |
| 2012/0143407 A1 | 6/2012 | Murthy |
| 2012/0146869 A1 | 6/2012 | Holland et al. |
| 2012/0149300 A1 | 6/2012 | Forster |
| 2012/0184203 A1 | 7/2012 | Tulino et al. |
| 2012/0184219 A1 | 7/2012 | Richardson et al. |
| 2012/0194385 A1 | 8/2012 | Schmidt et al. |
| 2012/0206299 A1 | 8/2012 | Valdes-Garcia |
| 2012/0224651 A1 | 9/2012 | Murakami et al. |
| 2012/0230274 A1 | 9/2012 | Xiao et al. |
| 2012/0238202 A1 | 9/2012 | Kim et al. |
| 2012/0250659 A1 | 10/2012 | Sambhwani |
| 2012/0257516 A1 | 10/2012 | Pazhyannur et al. |
| 2012/0259547 A1 | 10/2012 | Morlock et al. |
| 2012/0272857 A1 | 11/2012 | Graab et al. |
| 2012/0314570 A1 | 12/2012 | Forenza et al. |
| 2013/0023210 A1 | 1/2013 | Rofougaran |
| 2013/0027240 A1 | 1/2013 | Chowdhury |
| 2013/0027250 A1 | 1/2013 | Chen |
| 2013/0039342 A1* | 2/2013 | Kazmi .................. H04W 48/16 370/331 |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0069831 A1 | 3/2013 | Friedman et al. |
| 2013/0088393 A1 | 4/2013 | Lee et al. |
| 2013/0089123 A1 | 4/2013 | Rahul et al. |
| 2013/0094439 A1 | 4/2013 | Moshfeghi |
| 2013/0094440 A1 | 4/2013 | Moshfeghi |
| 2013/0094522 A1 | 4/2013 | Moshfeghi |
| 2013/0094544 A1 | 4/2013 | Moshfeghi |
| 2013/0095747 A1 | 4/2013 | Moshfeghi |
| 2013/0095770 A1 | 4/2013 | Moshfeghi |
| 2013/0095874 A1 | 4/2013 | Moshfeghi |
| 2013/0114468 A1 | 5/2013 | Hui et al. |
| 2013/0155891 A1 | 6/2013 | Dinan |
| 2013/0173094 A1 | 7/2013 | Cooper et al. |
| 2013/0208608 A1 | 8/2013 | Piazza et al. |
| 2013/0272220 A1 | 10/2013 | Li et al. |
| 2013/0272437 A1 | 10/2013 | Eidson et al. |
| 2013/0286962 A1 | 10/2013 | Heath, Jr. et al. |
| 2013/0287139 A1 | 10/2013 | Zhu et al. |
| 2013/0322561 A1 | 12/2013 | Abreu et al. |
| 2013/0324055 A1 | 12/2013 | Kludt et al. |
| 2013/0343235 A1 | 12/2013 | Khan |
| 2014/0003338 A1 | 1/2014 | Rahul et al. |
| 2014/0009347 A1 | 1/2014 | Bertin et al. |
| 2014/0010319 A1 | 1/2014 | Baik et al. |
| 2014/0016573 A1 | 1/2014 | Nuggehalli et al. |
| 2014/0022109 A1 | 1/2014 | Lee et al. |
| 2014/0035731 A1 | 2/2014 | Chan et al. |
| 2014/0035780 A1 | 2/2014 | Trotta |
| 2014/0044041 A1 | 2/2014 | Moshfeghi |
| 2014/0044042 A1 | 2/2014 | Moshfeghi |
| 2014/0044043 A1 | 2/2014 | Moshfeghi et al. |
| 2014/0045478 A1 | 2/2014 | Moshfeghi |
| 2014/0045541 A1 | 2/2014 | Moshfeghi et al. |
| 2014/0072078 A1 | 3/2014 | Sergeyev et al. |
| 2014/0079165 A1 | 3/2014 | Kludt et al. |
| 2014/0086191 A1 | 3/2014 | Berntsen et al. |
| 2014/0104124 A1 | 4/2014 | Chernokalov et al. |
| 2014/0125539 A1 | 5/2014 | Katipally et al. |
| 2014/0129060 A1 | 5/2014 | Cooper et al. |
| 2014/0133435 A1 | 5/2014 | Forenza et al. |
| 2014/0161018 A1 | 6/2014 | Chang et al. |
| 2014/0184439 A1 | 7/2014 | Ainspan et al. |
| 2014/0191905 A1 | 7/2014 | Kamgaing |
| 2014/0198696 A1 | 7/2014 | Li et al. |
| 2014/0210668 A1 | 7/2014 | Wang et al. |
| 2014/0241296 A1 | 8/2014 | Shattil |
| 2014/0266866 A1 | 9/2014 | Swirhun et al. |
| 2014/0378072 A1 | 12/2014 | Waldvogel et al. |
| 2015/0003307 A1 | 1/2015 | Moshfeghi et al. |
| 2015/0011160 A1 | 1/2015 | Jurgovan et al. |
| 2015/0015449 A1 | 1/2015 | Jecko et al. |
| 2015/0031407 A1 | 1/2015 | Moshfeghi |
| 2015/0042744 A1 | 2/2015 | Ralston et al. |
| 2015/0091706 A1 | 4/2015 | Chemishkian et al. |
| 2015/0123496 A1 | 5/2015 | Leabman et al. |
| 2015/0129668 A1 | 5/2015 | Kam et al. |
| 2015/0222230 A1 | 8/2015 | Tajima et al. |
| 2015/0229133 A1 | 8/2015 | Reynolds et al. |
| 2015/0241020 A1 | 8/2015 | Lee et al. |
| 2015/0296344 A1* | 10/2015 | Trojer .................. H04W 4/027 455/456.1 |
| 2015/0303950 A1 | 10/2015 | Shattil |
| 2015/0318897 A1 | 11/2015 | Hyde et al. |
| 2015/0318905 A1 | 11/2015 | Moshfeghi et al. |
| 2015/0324683 A1 | 11/2015 | Linfield |
| 2015/0340765 A1 | 11/2015 | Dang et al. |
| 2015/0341098 A1 | 11/2015 | Angeletti et al. |
| 2016/0014613 A1 | 1/2016 | Ponnampalam et al. |
| 2016/0043838 A1 | 2/2016 | Moshfeghi et al. |
| 2016/0054440 A1 | 2/2016 | Younis |
| 2016/0093957 A1 | 3/2016 | Moeller |
| 2016/0094092 A1 | 3/2016 | Davlantes et al. |
| 2016/0094318 A1 | 3/2016 | Shattil |
| 2016/0141248 A1 | 5/2016 | Pueschner et al. |
| 2016/0142114 A1 | 5/2016 | Moshfeghi et al. |
| 2016/0172761 A1 | 6/2016 | Garcia et al. |
| 2016/0192400 A1 | 6/2016 | Sohn et al. |
| 2016/0197665 A1 | 7/2016 | Moshfeghi et al. |
| 2016/0203347 A1 | 7/2016 | Bartholomew et al. |
| 2016/0204513 A1 | 7/2016 | Yemelong et al. |
| 2016/0211905 A1 | 7/2016 | Moshfeghi et al. |
| 2016/0219567 A1 | 7/2016 | Gil et al. |
| 2016/0240919 A1 | 8/2016 | Wu et al. |
| 2016/0285474 A1 | 9/2016 | Miyamae |
| 2016/0285481 A1 | 9/2016 | Cohen |
| 2017/0026218 A1 | 1/2017 | Shattil |
| 2017/0054216 A1 | 2/2017 | Shi et al. |
| 2017/0062944 A1 | 3/2017 | Zimmerman et al. |
| 2017/0078897 A1 | 3/2017 | Duan et al. |
| 2017/0126374 A1 | 5/2017 | Moshfeghi et al. |
| 2017/0156069 A1 | 6/2017 | Moshfeghi et al. |
| 2017/0187105 A1 | 6/2017 | Emerick et al. |
| 2017/0201437 A1 | 7/2017 | Balakrishnan et al. |
| 2017/0212208 A1 | 7/2017 | Baek et al. |
| 2017/0230099 A1 | 8/2017 | Moshfeghi et al. |
| 2017/0237290 A1 | 8/2017 | Bakker et al. |

(56) References Cited

U.S. PATENT DOCUMENTS

| | | | |
|---|---|---|---|
| 2017/0257155 | A1 | 9/2017 | Liang et al. |
| 2017/0264014 | A1 | 9/2017 | Le-Ngoc |
| 2017/0279573 | A1 | 9/2017 | Moshfeghi et al. |
| 2017/0288727 | A1 | 10/2017 | Rappaport |
| 2017/0317734 | A1 | 11/2017 | Moshfeghi |
| 2017/0317801 | A1 | 11/2017 | Moshfeghi et al. |
| 2017/0324480 | A1 | 11/2017 | Elmirghani et al. |
| 2017/0332249 | A1 | 11/2017 | Guey et al. |
| 2017/0338921 | A1 | 11/2017 | Moshfeghi |
| 2017/0339625 | A1 | 11/2017 | Stapleton |
| 2017/0353338 | A1 | 12/2017 | Amadjikpe et al. |
| 2018/0026586 | A1 | 1/2018 | Carbone et al. |
| 2018/0041270 | A1 | 2/2018 | Buer et al. |
| 2018/0048390 | A1 | 2/2018 | Palmer et al. |
| 2018/0063139 | A1 | 3/2018 | Day et al. |
| 2018/0090814 | A1 | 3/2018 | Yoon et al. |
| 2018/0090992 | A1 | 3/2018 | Shrivastava et al. |
| 2018/0091270 | A1 | 3/2018 | Moshfeghi |
| 2018/0109303 | A1 | 4/2018 | Yoo et al. |
| 2018/0115305 | A1 | 4/2018 | Islam et al. |
| 2018/0145421 | A1 | 5/2018 | Yoon et al. |
| 2018/0176799 | A1* | 6/2018 | Lange .................. H04B 7/2606 |
| 2018/0183152 | A1 | 6/2018 | Turpin et al. |
| 2018/0220416 | A1 | 8/2018 | Islam et al. |
| 2018/0234158 | A1 | 8/2018 | Moshfeghi |
| 2019/0089434 | A1 | 3/2019 | Rainish et al. |
| 2019/0123866 | A1 | 4/2019 | Moshfeghi |
| 2019/0230626 | A1 | 7/2019 | Rune et al. |
| 2019/0319754 | A1 | 10/2019 | Moshfeghi |
| 2019/0319755 | A1 | 10/2019 | Moshfeghi |
| 2019/0319756 | A1 | 10/2019 | Moshfeghi |
| 2020/0076491 | A1 | 3/2020 | Zhang et al. |
| 2020/0145079 | A1 | 5/2020 | Marinier et al. |

FOREIGN PATENT DOCUMENTS

| | | | |
|---|---|---|---|
| WO | 2008027531 | A2 | 3/2008 |
| WO | 2008027531 | A3 | 12/2008 |
| WO | 2012055468 | A1 | 5/2012 |
| WO | 2013058998 | A2 | 4/2013 |
| WO | 2013058999 | A2 | 4/2013 |
| WO | 2016115545 | A2 | 7/2016 |
| WO | 2016115545 | A3 | 10/2016 |

OTHER PUBLICATIONS

Notice of Allowance for U.S. Appl. No. 16/526,544 dated Apr. 9, 2020.

Notice of Allowance for U.S. Appl. No. 16/684,789 dated Jul. 10, 2020.

Notice of Allowance for U.S. Appl. No. 16/031,007 dated May 2, 2019.

Notice of Allowance in U.S. Appl. No. 15/655,255 dated Nov. 27, 2017.

Notice of Allowance in U.S. Appl. No. 14/488,355 dated Jun. 8, 2016.

Notice of Allowance in U.S. Appl. No. 15/225,071 dated Nov. 22, 2017.

Notice of Allowance in U.S. Appl. No. 15/255,656 dated Apr. 10, 2018.

Notice of Allowance in U.S. Appl. No. 15/256,038 dated Apr. 19, 2017.

Notice of Allowance in U.S. Appl. No. 15/356,172 dated Sep. 26, 2018.

Notice of Allowance in U.S. Appl. No. 15/432,091 dated Apr. 11, 2018.

Notice of Allowance in U.S. Appl. No. 15/432,185 dated Sep. 12, 2018.

Notice of Allowance in U.S. Appl. No. 15/488,355 dated Jul. 20, 2018.

Notice of Allowance in U.S. Appl. No. 15/607,743 dated Jan. 22, 2019.

Notice of Allowance in U.S. Appl. No. 15/724,638 dated Jul. 19, 2018.

Notice of Allowance in U.S. Appl. No. 15/834,894 dated Feb. 20, 2019.

Notice of Allowance in U.S. Appl. No. 15/835,971 dated May 29, 2018.

Notice of Allowance in U.S. Appl. No. 15/847,367 dated Aug. 29, 2018.

Notice of Allowance in U.S. Appl. No. 15/904,521 dated Mar. 20, 2019.

Notice of Allowance in U.S. Appl. No. 15/924,551 dated Nov. 6, 2018.

Notice of Allowance issued in U.S. Appl. No. 16/129,423 dated Jul. 15, 2019.

Patent Board Decision—Examiner Affirmed for U.S. Appl. No. 13/473,144 dated Jun. 4, 2018.

Patent Board Decision—Examiner Affirmed in Part for U.S. Appl. No. 13/473,160 dated Feb. 21, 2017.

Patent Board Decision—Examiner Reversed for U.S. Appl. No. 13/919,932 dated Dec. 19, 2017.

Response to Rule 312 Communication for U.S. Appl. No. 15/834,894 dated Apr. 19, 2019; Miscellaneous Communication to Applicant for U.S. Appl. No. 15/834,894 dated Apr. 19, 2019.

Restriction Requirement for U.S. Appl. No. 15/893,626 dated Aug. 12, 2016.

Restriction Requirement in U.S. Appl. No. 15/279,171 dated Dec. 21, 2017.

Shimin Gong et al., "Backscatter Relay Communications Powered by Wireless Energy Beamforming," IEEE Trans. on Communication, 2018.

Supplemental Notice of Allowability for U.S. Appl. No. 16/153,735 dated Jul. 22, 2020.

Supplemental Notice of Allowance for U.S. Appl. No. 16/032,668 dated Feb. 14, 2020.

Supplemental Notice of Allowance for U.S. Appl. No. 16/129,423 dated Mar. 3, 2020.

Supplemental Notice of Allowance for U.S. Appl. No. 16/153,735 dated Oct. 9, 2020.

Supplemental Notice of Allowance for U.S. Appl. No. 16/231,903 dated Apr. 30, 2020.

Supplemental Notice of Allowance for U.S. Appl. No. 16/231,903 dated Jul. 1, 2020.

Supplemental Notice of Allowance for U.S. Appl. No. 16/294,025 dated Mar. 25, 2020.

Zeng et al., "Joint relay selection and beamforming for mmWave fronthauling network," 2017 IEEE/CIC International Conference on Communications in China, Oct. 22, 2017, 6 pages.

Zhao, et al., A 60-GHz Outphasing Transmitter in 40-nm CMOS, IEEE Journal of Solid-State Circuits, pp. 3172-3183, vol. 47, No. 12, Dec. 2012.

Final Office Action for U.S. Appl. No. 13/473,144 dated Aug. 14, 2014.

Final Office Action for U.S. Appl. No. 13/919,932 dated Oct. 23, 2015.

Final Office Action for U.S. Appl. No. 13/919,972 dated Jan. 21, 2016.

Final Office Action for U.S. Appl. No. 14/940,130 dated Oct. 14, 2016.

Final Office Action for U.S. Appl. No. 15/256,222 dated Oct. 4, 2019.

Final Office Action for U.S. Appl. No. 15/607,750 dated Mar. 20, 2020.

Final Office Action for U.S. Appl. No. 16/125,757 dated Dec. 2, 2019.

Final Office Action for U.S. Appl. No. 16/125,757 dated Jul. 15, 2020.

Final Office Action for U.S. Appl. No. 16/129,413 dated Aug. 13, 2019.

Final Office Action for U.S. Appl. No. 16/364,956 dated Oct. 2, 2020.

Final Office Action for U.S. Appl. No. 16/377,847 dated Jul. 13, 2020.

(56) References Cited

OTHER PUBLICATIONS

Final Office Action for U.S. Appl. No. 16/377,980 dated Mar. 4, 2020.
Final Office Action for U.S. Appl. No. 16/388,043 dated Apr. 15, 2020.
Final Office Action for U.S. Appl. No. 16/526,544 dated Feb. 12, 2020.
Final Office Action for U.S. Appl. No. 16/666,680 dated Jun. 29, 2020.
Final Office Action for U.S. Application Serial No. dated Oct. 22, 2014.
Final Office Action in U.S. Appl. No. 15/724,638 dated Mar. 14, 2018.
Final Office Action in U.S. Appl. No. 15/607,750 dated May 22, 2019.
Final Office Action in U.S. Appl. No. 14/488,355 dated Mar. 4, 2016.
Imbert et al., "Design and Performance Evaluation of a Dielectric Flat Lens Antenna for Millimeter-Wave Applications," IEEE Antennas and Wireless Propagation Letters, vol. 14, 2015. pp. 1-4.
Imbert et al., "Design and Performance Evaluation of a Dielectric Flat Lens Antenna for Millimeter-Wave Applications," IEEE Antennas and Wireless Propagation Letters, vol. 14, pp. 342-345, 2015.
International Preliminary Report on Patentability for International Patent PCT/US2012/058839, 5 pages, dated Apr. 22, 2014.
International Preliminary Report on Patentability for International Patent PCT/US2012/058839, dated Apr. 22, 2014.
International Preliminary Report on Patentability for International Patent PCT/US2012/058842, 5 pages, dated Apr. 22, 2014.
International Search Report and the Written Opinion of the International Searching Authority in International application No. PCT/US12/58839, 6 pages, dated Apr. 4, 2013.
International Search Report and the Written Opinion of the International Searching Authority in International application No. PCT/US12/58842, 6 pages, dated Jan. 4, 2013.
International Search Report and Written Opinion for commonly owned International Patent Application PCT/US2012/058842, dated Jan. 4, 2013, Golba LLC.
International Search Report and Written Opinion in PCT/US2014/055984 dated Jun. 18, 2015, pp. 1-12.
International Search Report in PCT/US2018/064184 dated Jul. 1, 2019.
Invitation to Pay Additional Fees and, Where Applicable, Protest Fee, with Partial Search Report for PCT Appl No. PCT/US2018/064184 dated Apr. 10, 2019.
K. Han and K. Huang, "Wirelessly Powered Backscatter Communication networks: Modeling, Coverage and Capacity," Apr. 9, 2016, Arxiv.com.
List of References cited by Applicant and considered by Examiner for U.S. Appl. No. 14/325,218 dated Apr. 21, 2017.
McManus et al., A Comparative Study of Flat and Profiled Lenses, 2012 IEEE, vol., No., pp. 1-2, Jul. 8-14, 2012.
Misc Communication from USPTO for U.S. Appl. No. 16/382,386 dated Oct. 8, 2019.
Moloudi, et al., The Outphasing RF Power Amplifier: A Comprehensive Analysis and a Class-B CMOS Realization, IEEE Journal of Solid-State Circuits, pp. 1357-1369, vol. 48, No. 6, Jun. 2013.
Non-Final Office Action for U.S. Appl. No. 13/473,083 dated Mar. 3, 2014.
Non-Final Office Action for U.S. Appl. No. 13/473,096 dated Apr. 23, 2014.
Non-Final Office Action for U.S. Appl. No. 13/473,096 dated Dec. 9, 2013.
Non-Final Office Action for U.S. Appl. No. 13/473,096 dated Nov. 3, 2014.
Non-Final Office Action for U.S. Appl. No. 13/473,105 dated Nov. 25, 2013.
Non-Final Office Action for U.S. Appl. No. 13/473,113 dated Oct. 2, 2014.
Non-Final Office Action for U.S. Appl. No. 13/473,144 dated Feb. 6, 2014.
Non-Final Office Action for U.S. Appl. No. 13/473,144 dated Feb. 9, 2015.
Non-Final Office Action for U.S. Appl. No. 13/473,144 dated Oct. 7, 2015.
Non-Final Office Action for U.S. Appl. No. 13/473,160 dated Jan. 15, 2014.
Non-Final Office Action for U.S. Appl. No. 13/473,180 dated Sep. 12, 2013.
Non-Final Office Action for U.S. Appl. No. 13/919,922 dated Jan. 30, 2015.
Non-Final Office Action for U.S. Appl. No. 13/919,932 dated Feb. 6, 2015.
Non-Final Office Action for U.S. Appl. No. 13/919,958 dated Jan. 5, 2015.
Non-Final Office Action for U.S. Appl. No. 13/919,967 dated Feb. 9, 2015.
Non-Final Office Action for U.S. Appl. No. 16/016,619 dated Sep. 25, 2018.
Abbaspour-Tamijani et al., "Enhancing the Directivity of Phased Array Antennas Using Lens-Arrays," Progress in Electromagnetics Research M, vol. 29, 2013. pp. 41-64.
Abbaspour-Tamijani, et al., "Enhancing the Directivity of Phased Array Antennas Using Lens-Arrays", Progress in Electromagnetics Research M, vol. 29, 41-64, 2013.
Advisory Action for U.S. Appl. No. 15/607,750 dated Aug. 1, 2019.
Advisory Action in U.S. Appl. No. 15/724,638 dated May 25, 2018.
Baggett, Benjamin M.W. Optimization of Aperiodically Spaced Phased Arrays for Wideband Applications. MS Thesis. Virginia Polytechnic Institute and State University, 2011. pp. 1-137.
Boriskin et al., Numerical Investigation Into the Design of Shaped Dielectric Lens Antennas With Improved Angular Characteristics, Progress in Electromagnetics Research B, vol. 30, 279-292, 2011.
Corrected Notice of Allowability for U.S. Appl. No. 15/904,521 dated May 6, 2019.
Corrected Notice of Allowability for U.S. Appl. No. 15/256,222 dated Jul. 10, 2020.
Corrected Notice of Allowability for U.S. Appl. No. 16/111,326 dated Mar. 9, 2020.
Corrected Notice of Allowability for U.S. Appl. No. 16/377,980 dated Jul. 22, 2020.
Corrected Notice of Allowability for U.S. Appl. No. 16/526,544 dated Jul. 16, 2020.
Corrected Notice of Allowance for U.S. Appl. No. 16/031,007 dated Sep. 16, 2019.
Corrected Notice of Allowance for U.S. Appl. No. 16/526,544 dated Aug. 25, 2020.
Corrected Notice of Allowance for U.S. Appl. No. 16/031,007 dated Jul. 8, 2019.
Corrected Notice of Allowance for U.S. Appl. No. 15/607,743 dated May 10, 2019.
Corrected Notice of Allowance for U.S. Appl. No. 15/904,521 dated Jun. 21, 2019.
Corrected Notice of Allowance for U.S. Appl. No. 15/904,521 dated May 10, 2019.
Corrected Notice of Allowance for U.S. Appl. No. 16/382,386 dated Dec. 30, 2019.
Corrected Notice of Allowance for U.S. Appl. No. 16/526,544 dated May 13, 2020.
Corrected Notice of Allowance for U.S. Appl. No. 13/473,180 dated Jun. 11, 2014.
Corrected Notice of Allowance for U.S. Appl. No. 15/616,911 dated Jan. 24, 2020.
Corrected Notice of Allowance for U.S. Appl. No. 15/616,911 dated Oct. 31, 2019.
Corrected Notice of Allowance for U.S. Appl. No. 15/616,911 dated Dec. 12, 2019.
Corrected Notice of Allowance for U.S. Appl. No. 15/836,198 dated May 22, 2020.
Corrected Notice of Allowance for U.S. Appl. No. 15/836,198 dated Oct. 2, 2020.

(56) References Cited

OTHER PUBLICATIONS

Corrected Notice of Allowance for U.S. Appl. No. 15/904,521 dated Aug. 5, 2019.
Corrected Notice of Allowance for U.S. Appl. No. 15/904,521 dated Jan. 8, 2020.
Corrected Notice of Allowance for U.S. Appl. No. 15/904,521 dated Mar. 12, 2020.
Corrected Notice of Allowance for U.S. Appl. No. 16/031,007 dated Aug. 5, 2019.
Corrected Notice of Allowance for U.S. Appl. No. 16/031,007 dated Oct. 22, 2019.
Corrected Notice of Allowance for U.S. Appl. No. 16/032,617 dated Jan. 9, 2020.
Corrected Notice of Allowance for U.S. Appl. No. 16/032,617 dated Oct. 28, 2019.
Corrected Notice of Allowance for U.S. Appl. No. 16/032,668 dated Dec. 30, 2019.
Corrected Notice of Allowance for U.S. Appl. No. 16/032,668 dated Mar. 23, 2020.
Corrected Notice of Allowance for U.S. Appl. No. 16/111,326 dated Apr. 23, 2020.
Corrected Notice of Allowance for U.S. Appl. No. 16/129,423 dated Jan. 23, 2020.
Corrected Notice of Allowance for U.S. Appl. No. 16/129,423 dated Nov. 7, 2019.
Corrected Notice of Allowance for U.S. Appl. No. 16/294,025 dated May 18, 2020.
Corrected Notice of Allowance for U.S. Appl. No. 16/377,980 dated Oct. 5, 2020.
Corrected Notice of Allowance for U.S. Appl. No. 16/382,386 dated Feb. 6, 2020.
Corrected Notice of Allowance for U.S. Appl. No. 16/526,544 dated Sep. 25, 2020.
Corrected Notice of Allowance in U.S. Appl. No. 15/607,743 dated Apr. 3, 2019.
Corrected Notice of Allowance in U.S. Appl. No. 15/835,971 dated Jul. 23, 2018.
Dennis R Morgan et al., "A same-frequency cellular repeater using adaptive feedback cancellation," Global Communications Conference (GLOBECOM), 2012 IEEE, IEEE, (2012) XP032375270, pp. 3825-3830, 2012.
Ex Parte Quayle Action for U.S. Appl. No. 16/032,668 dated Jul. 10, 2019.
Examinees Answer to Appeal Brief for U.S. Appl. No. 13/473,144 dated Jul. 26, 2017.
Examinees Answer to Appeal Brief for U.S. Appl. No. 13/473,160 dated Dec. 24, 2015.
Examinees Answer to Appeal Brief for U.S. Appl. No. 13/919,932 dated Jan. 10, 2017.
Final Office Action for U.S. Appl. No. 13/473,144 dated Jul. 28, 2016.
Non-Final Office Action for U.S. Appl. No. 13/919,972 dated Jun. 4, 2015.
Non-Final Office Action for U.S. Appl. No. 14/455,859 dated Nov. 13, 2015.
Non-Final Office Action for U.S. Appl. No. 14/709,136 dated Sep. 28, 2016.
Non-Final Office Action for U.S. Appl. No. 14/813,058 dated Jun. 10, 2016.
Non-Final Office Action for U.S. Appl. No. 14/940,130 dated Apr. 6, 2016.
Non-Final Office Action for U.S. Appl. No. 14/980,281 dated Apr. 20, 2016.
Non-Final Office Action for U.S. Appl. No. 14/980,338 dated Mar. 14, 2017.
Non-Final Office Action for U.S. Appl. No. 15/229,135 dated Dec. 21, 2017.
Non-Final Office Action for U.S. Appl. No. 15/256,222 dated Aug. 27, 2018.
Non-Final Office Action for U.S. Appl. No. 15/256,222 dated Mar. 21, 2019.
Non-Final Office Action for U.S. Appl. No. 15/372,417 dated May 3, 2018.
Non-Final Office Action for U.S. Appl. No. 15/441,209 dated Jul. 3, 2018.
Non-Final Office Action for U.S. Appl. No. 15/595,940 dated Nov. 17, 2017.
Non-Final Office Action for U.S. Appl. No. 15/607,750 dated Sep. 17, 2019.
Non-Final Office Action for U.S. Appl. No. 15/616,911 dated Jan. 3, 2019.
Non-Final Office Action for U.S. Appl. No. 15/706,759 dated Jun. 12, 2018.
Non-Final Office Action for U.S. Appl. No. 15/893,626 dated Jun. 12, 2018.
Non-Final Office Action for U.S. Appl. No. 16/101,044 dated Dec. 26, 2018.
Non-Final Office Action for U.S. Appl. No. 16/125,757 dated Aug. 9, 2019.
Non-Final Office Action for U.S. Appl. No. 16/125,757 dated Mar. 23, 2020.
Non-Final Office Action for U.S. Appl. No. 16/129,413 dated Feb. 12, 2020.
Non-Final Office Action for U.S. Appl. No. 16/129,413 dated Feb. 4, 2019.
Non-Final Office Action for U.S. Appl. No. 16/129,423 dated Feb. 4, 2019.
Non-Final Office Action for U.S. Appl. No. 16/153,735 dated May 13, 2020.
Non-Final Office Action for U.S. Appl. No. 16/204,397 dated Sep. 17, 2020.
Non-Final Office Action for U.S. Appl. No. 16/231,903 dated Sep. 18, 2019.
Non-Final Office Action for U.S. Appl. No. 16/294,025 dated Sep. 12, 2019.
Non-Final Office Action for U.S. Appl. No. 16/364,956 dated Apr. 10, 2020.
Non-Final Office Action for U.S. Appl. No. 16/377,847 dated Apr. 20, 2020.
Non-Final Office Action for U.S. Appl. No. 16/377,980 dated Aug. 21, 2019.
Non-Final Office Action for U.S. Appl. No. 16/388,043 dated Aug. 3, 2020.
Non-Final Office Action for U.S. Appl. No. 16/388,043 dated Dec. 27, 2019.
Non-Final Office Action for U.S. Appl. No. 16/451,998 dated Sep. 11, 2020.
Non-Final Office Action for U.S. Appl. No. 16/452,023 dated Sep. 9, 2020.
Non-Final Office Action for U.S. Appl. No. 16/461,980 dated Sep. 21, 2020.
Non-Final Office Action for U.S. Appl. No. 16/526,544 dated Sep. 18, 2019.
Non-Final Office Action for U.S. Appl. No. 16/666,680 dated Feb. 19, 2020.
Non-Final Office Action for U.S. Appl. No. 16/675,290 dated Apr. 30, 2020.
Non-Final Office Action for U.S. Appl. No. 16/684,789 dated Mar. 13, 2020.
Non-Final Office Action for U.S. Appl. No. 16/689,758 dated Sep. 29, 2020.
Non-Final Office Action for U.S. Appl. No. 16/819,388 dated Jul. 2, 2020.
Non-Final Office Action for U.S. Appl. No. 16/866,536 dated Sep. 1, 2020.
Non-Final Office Action in U.S. Appl. No. 15/836,198 dated Oct. 31, 2019.
Non-Final Office Action in U.S. Appl. No. 14/488,355 dated Nov. 13, 2015.
Non-Final Office Action in U.S. Appl. No. 15/225,071 dated Aug. 21, 2017.

(56) References Cited

OTHER PUBLICATIONS

Non-Final Office Action in U.S. Appl. No. 15/278,970 dated Jan. 3, 2018.
Non-Final Office Action in U.S. Appl. No. 15/279,171 dated Apr. 24, 2018.
Non-Final Office Action in U.S. Appl. No. 15/279,219 dated Dec. 27, 2017.
Non-Final Office Action in U.S. Appl. No. 15/335,034 dated Apr. 6, 2018.
Non-Final Office Action in U.S. Appl. No. 15/356,172 dated Mar. 14, 2018.
Non-Final Office Action in U.S. Appl. No. 15/432,018 dated Nov. 6, 2017.
Non-Final Office Action in U.S. Appl. No. 15/432,018 dated Sep. 25, 2018.
Non-Final Office Action in U.S. Appl. No. 15/432,091 dated Nov. 22, 2017.
Non-Final Office Action in U.S. Appl. No. 15/432,185 dated Dec. 5, 2017.
Non-Final Office Action in U.S. Appl. No. 15/600,443 dated Dec. 27, 2017.
Non-Final Office Action in U.S. Appl. No. 15/607,750 dated Dec. 11, 2018.
Non-Final Office Action in U.S. Appl. No. 15/640,174 dated Jun. 8, 2018.
Non-Final Office Action in U.S. Appl. No. 15/724,638 dated Nov. 6, 2017.
Non-Final Office Action in U.S. Appl. No. 15/924,551 dated Jun. 13, 2018.
Non-Final Office Action in U.S. Appl. No. 16/111,326 dated Mar. 1, 2019.
Notice of Allowance for U.S. Appl. No. 13/473,083 dated Jan. 7, 2015.
Notice of Allowance for U.S. Appl. No. 16/032,668 dated Sep. 20, 2019.
Notice of Allowance for U.S. Appl. No. 13/473,096 dated Apr. 17, 2015.
Notice of Allowance for U.S. Appl. No. 13/473,105 dated Jun. 10, 2014.
Notice of Allowance for U.S. Appl. No. 13/473,113 dated Aug. 10, 2015.
Notice of Allowance for U.S. Appl. No. 13/473,160 dated May 25, 2017.
Notice of Allowance for U.S. Appl. No. 13/473,180 dated May 1, 2014.
Notice of Allowance for U.S. Appl. No. 13/919,922 dated Oct. 27, 2015.
Notice of Allowance for U.S. Appl. No. 13/919,932 dated Feb. 28, 2018.
Notice of Allowance for U.S. Appl. No. 13/919,958 dated Sep. 2, 2015.
Notice of Allowance for U.S. Appl. No. 13/919,967 dated Jul. 29, 2019.
Notice of Allowance for U.S. Appl. No. 13/919,972 dated Dec. 20, 2016.
Notice of Allowance for U.S. Appl. No. 14/325,218 dated Dec. 19, 2016.
Notice of Allowance for U.S. Appl. No. 14/455,859 dated Apr. 20, 2016.
Notice of Allowance for U.S. Appl. No. 14/709,136 dated Feb. 16, 2017.
Notice of Allowance for U.S. Appl. No. 14/813,058 dated Nov. 7, 2016.
Notice of Allowance for U.S. Appl. No. 14/940,130 dated Feb. 1, 2017.
Notice of Allowance for U.S. Appl. No. 14/980,281 dated Feb. 7, 2017.
Notice of Allowance for U.S. Appl. No. 14/980,338 dated Feb. 22, 2018.
Notice of Allowance for U.S. Appl. No. 15/229,135 dated May 22, 2018.
Notice of Allowance for U.S. Appl. No. 15/256,222 dated Apr. 3, 2020.
Notice of Allowance for U.S. Appl. No. 15/372,417 dated Dec. 7, 2018.
Notice of Allowance for U.S. Appl. No. 15/441,209 dated Dec. 28, 2018.
Notice of Allowance for U.S. Appl. No. 15/472,148 dated Dec. 10, 2018.
Notice of Allowance for U.S. Appl. No. 15/595,919 dated Jun. 5, 2019.
Notice of Allowance for U.S. Appl. No. 15/595,919 dated Oct. 25, 2019.
Notice of Allowance for U.S. Appl. No. 15/595,940 dated May 1, 2018.
Notice of Allowance for U.S. Appl. No. 15/607,750 dated Jun. 1, 2020.
Notice of Allowance for U.S. Appl. No. 15/616,911 dated Jul. 24, 2019.
Notice of Allowance for U.S. Appl. No. 15/836,198 dated Apr. 17, 2020.
Notice of Allowance for U.S. Appl. No. 15/904,521 dated Sep. 20, 2019.
Notice of Allowance for U.S. Appl. No. 16/111,326 dated Oct. 10, 2019.
Notice of Allowance for U.S. Appl. No. 16/129,413 dated Aug. 12, 2020.
Notice of Allowance for U.S. Appl. No. 16/129,423 dated Jul. 15, 2019.
Notice of Allowance for U.S. Appl. No. 16/129,423 dated Nov. 27, 2019.
Notice of Allowance for U.S. Appl. No. 16/153,735 dated Jul. 2, 2020.
Notice of Allowance for U.S. Appl. No. 16/206,450 dated Sep. 5, 2019.
Notice of Allowance for U.S. Appl. No. 16/231,903 dated Mar. 24, 2020.
Notice of Allowance for U.S. Appl. No. 16/294,025 dated Jan. 13, 2020.
Notice of Allowance for U.S. Appl. No. 16/377,980 dated Apr. 14, 2020.
Notice of Allowability for U.S. Appl. No. 16/129,413 dated Jan. 6, 2021.
Corrected Notice of Allowability for U.S. Appl. No. 16/684,789 dated Jan. 11, 2021.
Corrected Notice of Allowance for U.S. Appl. No. 15/256,222 dated Oct. 28, 2020.
Corrected Notice of Allowance for U.S. Appl. No. 16/125,757 dated Dec. 31, 2020.
Corrected Notice of Allowance for U.S. Appl. No. 16/129,413 dated Nov. 27, 2020.
Corrected Notice of Allowance for U.S. Appl. No. 16/153,735 dated Nov. 18, 2020.
Corrected Notice of Allowance for U.S. Appl. No. 16/364,956 dated Jan. 6, 2021.
Corrected Notice of Allowance for U.S. Appl. No. 16/388,043 dated Dec. 24, 2020.
Corrected Notice of Allowance for U.S. Appl. No. 16/388,043 dated Dec. 30, 2020.
Corrected Notice of Allowance for U.S. Appl. No. 16/675,290 dated Dec. 16, 2020.
Corrected Notice of Allowance for U.S. Appl. No. 16/684,789 dated Nov. 20, 2020.
Non-Final Office Action for U.S. Appl. No. 16/233,044 dated Oct. 14, 2020.
Non-Final Office Action for U.S. Appl. No. 16/377,847 dated Dec. 14, 2020.
Non-Final Office Action for U.S. Appl. No. 16/398,156 dated Oct. 15, 2020.
Non-Final Office Action for U.S. Appl. No. 16/666,680 dated Nov. 13, 2020.

(56) References Cited

OTHER PUBLICATIONS

Non-Final Office Action for U.S. Appl. No. 16/941,690 dated Nov. 12, 2020.
Notice of Allowability for U.S. Appl. No. 15/607,750 dated Jan. 11, 2021.
Notice of Allowability for U.S. Appl. No. 16/129,413 dated Nov. 9, 2020.
Notice of Allowance for U.S. Appl. No. 16/125,757 dated Oct. 28, 2020.
Notice of Allowance for U.S. Appl. No. 16/204,397 dated Jan. 12, 2021.
Notice of Allowance for U.S. Appl. No. 16/364,956 dated Dec. 11, 2020.
Notice of Allowance for U.S. Appl. No. 16/388,043 dated Nov. 5, 2020.
Notice of Allowance for U.S. Appl. No. 16/452,023 dated Nov. 16, 2020.
Supplemental Notice of Allowability for U.S. Appl. No. 16/153,735 dated Jan. 11, 2021.
Notice of Allowance for U.S. Appl. No. 16/819,388 dated Jan. 25, 2021.
Notice of Allowance for U.S. Appl. No. 16/689,758 dated Jan. 22, 2021.
Notice of Allowance for U.S. Appl. No. 16/451,998 dated Jan. 14, 2021.
International Preliminary Report on Patentability for International Application No. PCT/US2018/064184 dated Jan 21, 2021.
Morgan et al., "A Same-Frequency Cellular Repeater Using Adaptive Feedback Cancellation," IEEE, Mar. 12, 2012, pp. 3825-3830.

\* cited by examiner

RECONFIGURABLE AND MODULAR ACTIVE REPEATER DEVICE

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 16/526,544, filed Jul. 30, 2019, which is a Continuation Application of U.S. Pat. No. 10,484,078, filed Jul. 10, 2018, entitled "Reconfigurable And Modular Active Repeater Device", which claims priority to U.S. Provisional Application Ser. No. 62/531,161, filed Jul. 11, 2017.

The above referenced applications are hereby incorporated herein by reference in its entirety.

FIELD OF TECHNOLOGY

Certain embodiments of the disclosure relate to an active repeater device in a wireless telecommunication system. More specifically, certain embodiments of the disclosure relate to a reconfigurable and modular active repeater device.

BACKGROUND

Wireless telecommunication in modern times has witnessed advent of various signal transmission techniques and methods, such as use of beam forming and beam steering techniques, for enhancing capacity of radio channels. In accordance with such techniques, a transmitter radiates radio waves in form of beams of radio frequency (RF) signals to a variety of RF receiver devices. The conventional systems which use techniques such as beamforming and beam steering for signal transmission may have one or more limitations. For example, a beam of RF signals transmitted by conventional systems, may be highly directional in nature and may be limited in transmission range or coverage.

In certain scenarios, an RF receiver device may be situated at a distance which is beyond transmission range of the transmitter, and hence reception of the RF signal at the RF receiver device may be adversely affected. In other scenarios one or more obstructions (such as buildings and hills) in path of the RF beam transmitted by the transmitter, may be blocking reception of the RF signal at the RF receiver device. For the advanced high-performance fifth generation (5G) communication networks, such as the millimeter wave communication system, there is required a dynamic system that can overcome the one or more limitations of conventional systems.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A reconfigurable and modular active repeater device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a reconfigurable and modular active repeater device. Emergence of 5G networks in cm-wave and mm-wave bands is introducing new opportunities as well as new technical challenges. 5G networks may provide orders of magnitude improvement in throughput and capacity complimented by the availability of wider spectrum bands, for example, in 28/39/60 GHz frequencies (or between 28-300 GHz) and massive frequency reuse through utilization of highly directional antennas. However, deployment of 5G networks is conditioned on overcoming certain challenges, for example:

1. Higher propagation loss at high frequencies with a single antenna of size ~λ/2. This is a well understood challenge, where use of steerable phased arrays may overcome this challenge by building large antenna apertures through co-phasing of many small antenna elements.
2. Need for trackable line-of-sight (LOS) path or strong reflective path between transmitter and receiver. Lack of refraction and diffraction in high radio frequencies also limits availability of links to LOS path or strong mirror-like reflective paths. This may be a constraint to deliver wireless connections that are to be made available anywhere and anytime.
3. High transmittance loss through the signal-obstructing physical objects or material at high radio frequencies. The high radio frequencies, such as the cm-wave and mm-wave radio signals, demonstrate high transmittance losses when propagating through typical signal-obstructing physical objects or materials, such as tinted glass, wood, drywall, other glasses etc., when compared to sub-5 GHz radio signals. This may be a constraint to availability of connections, anywhere and anytime that may be desirable.

Although, the first challenge is well understood and successfully mitigated by use of large phased array antennas. However, currently, there are no widely-agreed-on and/or standard mitigation techniques to the second and the third challenges as given above. The disclosed active repeater device comprises a reconfigurable and modular architecture that mitigates the two remaining challenges. In the following description, reference is made to the accompanying drawings, which form a part hereof, and in which is shown, by way of illustration, various embodiments of the present disclosure.

Figure 1:
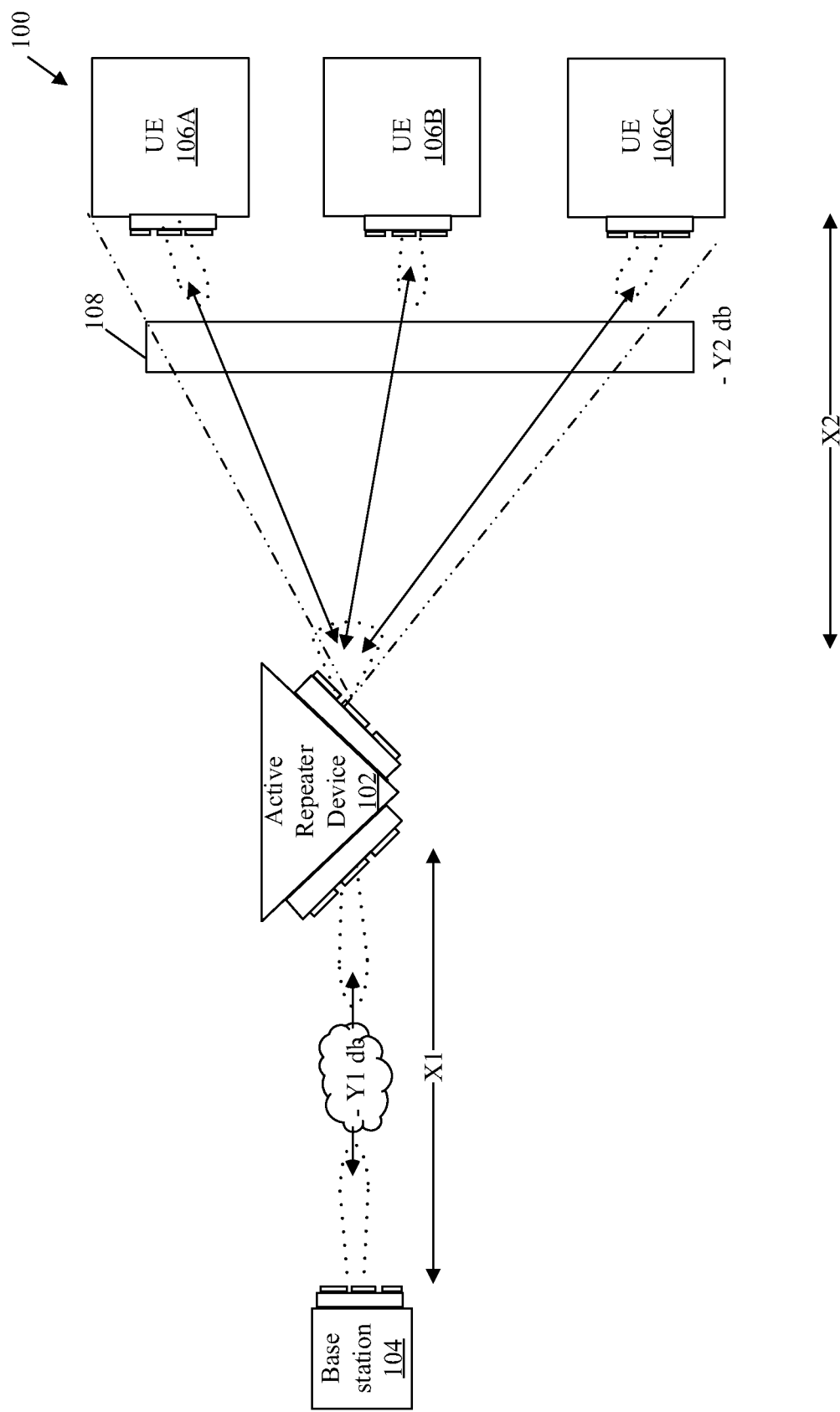
FIG. 1 is a network environment diagram that illustrates an exemplary active repeater device communicatively coupled to a base station and one or more user equipment (UE), in accordance with an exemplary embodiment of the disclosure.

FIG. 1 is a network environment diagram that illustrates an exemplary active repeater device communicatively coupled to a base station and one or more user equipment, in accordance with an exemplary embodiment of the disclosure. With reference to FIG. 1, there is shown a network environment diagram 100 that may include an active repeater device 102, a base station 104 and one or more user equipment (UEs) 106A, 106B, and 106C. There is also shown a signal-obstructing physical object 108 that may partially block or impair a beam of RF signals communicated between the active repeater device 102 and the one or more remote UEs 106A, 106B, and 106C.

The active repeater device 102 may have a modular architecture that includes a primary sector and one or more secondary sectors. The primary sector may include a baseband signal processor and a first radio head (RH) unit. The baseband signal processor may also be referred to as a light baseband unit (LBU) or a simplified baseband unit (BBU) that may be smaller in size as compared to a conventional BBU to be housed in the primary sector of the active repeater device 102. Each of the one or more secondary sectors may include a second RH unit. Each of the one or more secondary sectors may be communicatively coupled to the primary sector via one or more baseband (IQ) signal cables and a control signal cable. In accordance with an embodiment, the active repeater device 102 may support multiple and a wide range of frequency spectrum, for example, 1G, 2G, 3G, 4G, and 5G. Alternatively stated, the active repeater device 102 may facilitate communication in both sub 30 gigahertz to above 30 gigahertz. The band of radio frequencies in the electromagnetic spectrum from 30 to 300 gigahertz is usually referred to as extremely high frequency (EHF) communication. Such radio frequencies have wavelengths from ten to one millimeter, referred to as millimeter wave (mmW).

The active repeater device 102 may be configured to receive input RF signals. In one example, the active repeater device 102 may receive the input RF signals from the base station 104. In certain scenarios, the active repeater device 102 may be positioned in a vicinity of a signal-obstructing physical object 108, which may partially block the path of the input RF signals. The active repeater device 102 may be realized by various components, such as transmitter front-ends, receiver front-ends, a plurality of low-noise amplifiers, a plurality of phase shifters, a plurality of power combiners, a plurality of power dividers, and a plurality of power amplifiers, logical control units, controllers and mixers.

The base station 104 may be a fixed point of communication that may relay information, in form of a plurality of beams of RF signals, to and from communication devices such as the active repeater device 102 and the one or more remote UEs 106A, 106B, and 106C. Multiple base stations corresponding to one service provider, may be geographically positioned to cover specific geographical areas. Typically, bandwidth requirements serve as a guideline for a location of the base station 104 based on relative distance between the one or more remote UEs 106A, 106B, and 106C and the base station 104. The count of base stations may be dependent on, for example, population density and geographic irregularities, such as buildings and mountain ranges, which may interfere with the plurality of beams of RF signals.

The one or more remote UEs 106A, 106B, and 106C may correspond to a telecommunication hardware used by an end-user to communicate. Alternatively stated, the one or more remote UEs 106A, 106B, and 106C may refer a combination of mobile equipment and subscriber identity module (SIM). Each of the one or more remote UEs 106A, 106B, and 106C may be configured to communicate with the active repeater device 102 by use of RF signals. Examples of the one or more remote UEs 106A, 106B, and 106C may include, but are not limited to a smartphone, a customer-premises equipment (CPE), a wireless modem, a home router, a cable or satellite television set-top box, a VoIP base station, or any other customized hardware for telecommunication.

The active repeater device 102 may be deployed between the base station 104 (e.g. an eNB) and the one or more remote UEs 106A, 106B, and 106C to mitigate lack of line-of-sight (LOS) between the base station 104 and the one or more remote UEs 106A, 106B, and 106C. The base station 104 may be located at a certain distance (for example, "X1" meters) away from the active repeater device 102. Therefore, radio frequency (RF) signals which may be transmitted between the active repeater device 102 and the base station 104 may suffer the loss of a particular amount (for example, "−Y1" decibels) of signal strength as propagation loss. For example, the base station 104 may be "X1" (e.g. 800) meters away from the active repeater device 102. In such a case, RF signals transmitted from the base station 104 to the active repeater device 102 may suffer from a certain propagation loss, for example, −3 decibels. In certain scenarios, the one or more remote UEs 106A, 106B, and 106C may be present at a certain distance (for example, "X2" meters) from the active repeater device 102. The signal-obstructing physical object 108 may make it difficult for RF signals to pass through it (i.e. through the signal-obstructing physical object 108) in a wireless communication network in the LOS transmission path. Examples of the signal-obstructing physical object 108 may include, but are not limited to tall buildings, tinted glass, doors, walls, trees, physical landscape, and high-voltage power conductors. The RF signals transmitted between the active repeater device 102 and the one or more remote UEs 106A, 106B, and 106C may suffer certain amount of attenuation (for example, "−Y2" decibels) because of the presence of the signal-obstructing physical object 108, such as a tinted glass plane. For example, the signal-obstructing physical object 108 may cause a total attenuation of certain decibels on RF signals communicated between the base station 104 and the one or more remote UEs 106A, 106B, 106C.

In operation, the active repeater device 102 may be configured to receive a first beam of input RF signals from the base station 104. Alternatively, the first beam of input RF signals may be received from at least one of one or more remote user equipment (UEs) in a LOS region or an NLOS region of the active repeater device 102. In certain scenarios, the active repeater device 102 may be configured to receive the first beam of input RF signals from another active repeater device which may be a part of a non-line-of-sight (NLOS) transmission path. The NLOS transmission path may be between the base station 104 and the one or more remote UEs 106A, 106B, and 106C. The active repeater device 102 exhibits a demodulator-less architecture to avoid introduction of latency through the active repeater device 102. As a result of the demodulator-less architecture, one or more beams of output RF signals are transmitted by one or more antenna arrays of the active repeater device 102 to the one or more remote UEs 106A, 106B, and 106C without demodulation of data portion of the received first beam of input RF signals to minimize the latency for transmission of the one or more beams of output RF signals while maintaining a final error vector magnitude (EVM) target at end destination point (i.e. the one or more remote UEs 106A, 106B, and 106C).

The active repeater device 102 may comprise a digital modem circuitry, for example, an embedded 5G modem. The digital modem circuitry may utilize the received signal (i.e. the received first beam of input RF signals) for control and monitoring operations, such as configuring and monitoring beamforming functions. Conventional active repeaters/relays/boosters are either simple RF amplification with no configurability. Beamforming, TDD-switching capabilities, or they are full decode/recode relay nodes with a modem in the signal path and hence with a higher latency. However, the active repeater device 102 does not process (i.e., demodulate) data stream in the received signal intended for end destination (i.e. the one or more remote UEs 106A, 106B, and 106C). The data stream may also be referred to as the data portion of the received first beam of input RF signals. Only the header portion of the received signal may be taped into and decoded in the control path by the active repeater device 102 to extract control information. For example, some subcarriers in the waveform of the received signal (i.e. the received first beam of input RF signals) may be dedicated for active repeater device 102 for internal consumption, while the rest of subcarriers are assigned to other end users (i.e. the one or more remote UEs 106A, 106B, and 106C). In this case, the digital modem circuitry selectively decodes only the subcarriers (that includes the control information) assigned for the consumption of the active repeater device 102 and the full received RF signal is still relayed towards the destination without demodulation of full waveform. This is done to achieve near-zero-latency while maintaining a final error vector magnitude (EVM) target at end destination point (i.e. the one or more remote UEs 106A, 106B, and 106C) without relying on demodulation or re-modulation at an intermediate point, such as the deployment location of the active repeater device 102, for boosting EVM. Although this sets a higher limit on signal-to-noise ratio (SNR) quality for signal propagation through the active repeater device 102, the active repeater device 102 may still achieve a target final Rx SNR (i.e. signal quality at one or more remote UEs 106A, 106B, and 106C may be greater than a defined threshold SNR, for example, ~22 dB) as a result of the modular architecture of the active repeater device 102 and generation of one or more control signals based on the header portion of the received first beam of input RF signals. Further, a conventional baseband unit (BBU) is costly and high-power-consumption. In contrast, a baseband signal processor of the primary sector of the active repeater device 102 may be implemented as the baseband signal processor card or chip, which is smaller in size and consumes less power in comparison with the conventional BBU. Thus, the baseband signal processor of the primary sector may also be referred to as a light baseband unit (LBU) or a simplified baseband unit (BBU) that may be smaller in size as compared to a conventional BBU.

In some embodiments, each of the one or more secondary sectors of the active repeater device 102 may include a baseband signal processor and the second RH unit. The second antenna array in the second RH unit may be configured to receive a first beam of input RF signals. The first beam of input RF signals may be received from at least one of one or more remote user equipment (UEs) or a base station in a LOS region or an NLOS region of the active repeater device 102. The circuitry in the second RH unit may be configured to generate a first set of analog baseband signals based on the received first beam of input RF signals. The second circuitry in the baseband signal processor may be configured to convert the first set of analog baseband signals received from the second RH unit to a first set of coded data signals. Thereafter, the digital modem circuitry in the baseband signal processor may be configured to extract control information from the first set of coded data signals by decoding only a header portion of the first set of coded data signals without demodulation of data portion of the first set of coded data signals. The primary sector in the active repeater device 102, communicatively coupled to the one or more secondary sectors, may include the first radio head RH unit. The first RH unit may be configured to transmit the first set of coded data signals as a beam of output RF signals, by the first antenna array of the primary sector, to at least the one or more remote user equipment (UEs) or a base station, based on the extracted control information from the first set of coded data signals. The beam of output RF signals is transmitted without demodulation of the data portion of the first set of coded data signals within the active repeater device to reduce latency for transmission of the first set of coded data signals.

In some embodiments, the baseband signal processor may include a digital signal processor, which may be a specialized digital computational circuitry that is configured to digitally model an echo signal at a receiver side, caused by reflection of RF signals transmitted from the transmitter side of the active repeater device 102. More specifically, the RF signals that are transmitted by either the first RH unit or the second RH unit may get reflected from surroundings and may be further received by the first RH unit or the second RH unit back again as an echo signal. The echo signal may cause self-interference with the RF signals received at the receiver side of the active repeater device 102. Upon mixing with the RF signals at the receiver side, the echo signal may cause a decrease in a signal to noise ratio (SNR) (measured in decibels (dB)) of the RF signals that are received at the receiver side of the active repeater device 102.

The digital signal processor may be configured to estimate, in a digital baseband domain, a digital echo signal in one or more current digital baseband signals received from at least the first RH unit or the second RH unit. The one or more current digital baseband signals correspond to RF signals that are received in real time by at least the first RH unit or the second RH unit. The baseband signal processor may implement a multi-tap FIR filter to estimate the digital echo signal in the one or more current digital baseband signals. Thereafter, the digital signal processor may be configured to remove, at a receiver side of the active repeater device 102, an estimate of the digital echo signal from the one or more current digital baseband signals, received as RF signals via at least the first RH unit or the second RH unit. The detailed operation of the digital signal processor for active cancellation of the digital echo signal in the digital baseband domain has been further described in detail, for example, in FIG. 6B.

Figure 2A:
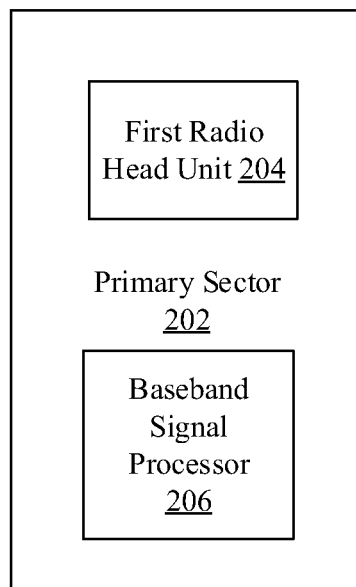
FIG. 2A is a block diagram illustrating an exemplary one-sector active repeater device, in accordance with an exemplary embodiment of the disclosure.

FIG. 2A is a block diagram illustrating an exemplary one-sector active repeater device, in accordance with an exemplary embodiment of the disclosure. FIG. 2A is explained in conjunction with elements from FIG. 1. With reference to FIG. 2A, there is shown a one-sector active repeater device 102 that includes a primary sector 202 of the active repeater device 102. The primary sector 202 of the active repeater device 102 comprises a first radio head (RH) unit 204 and a baseband signal processor 206.

Figure 5:
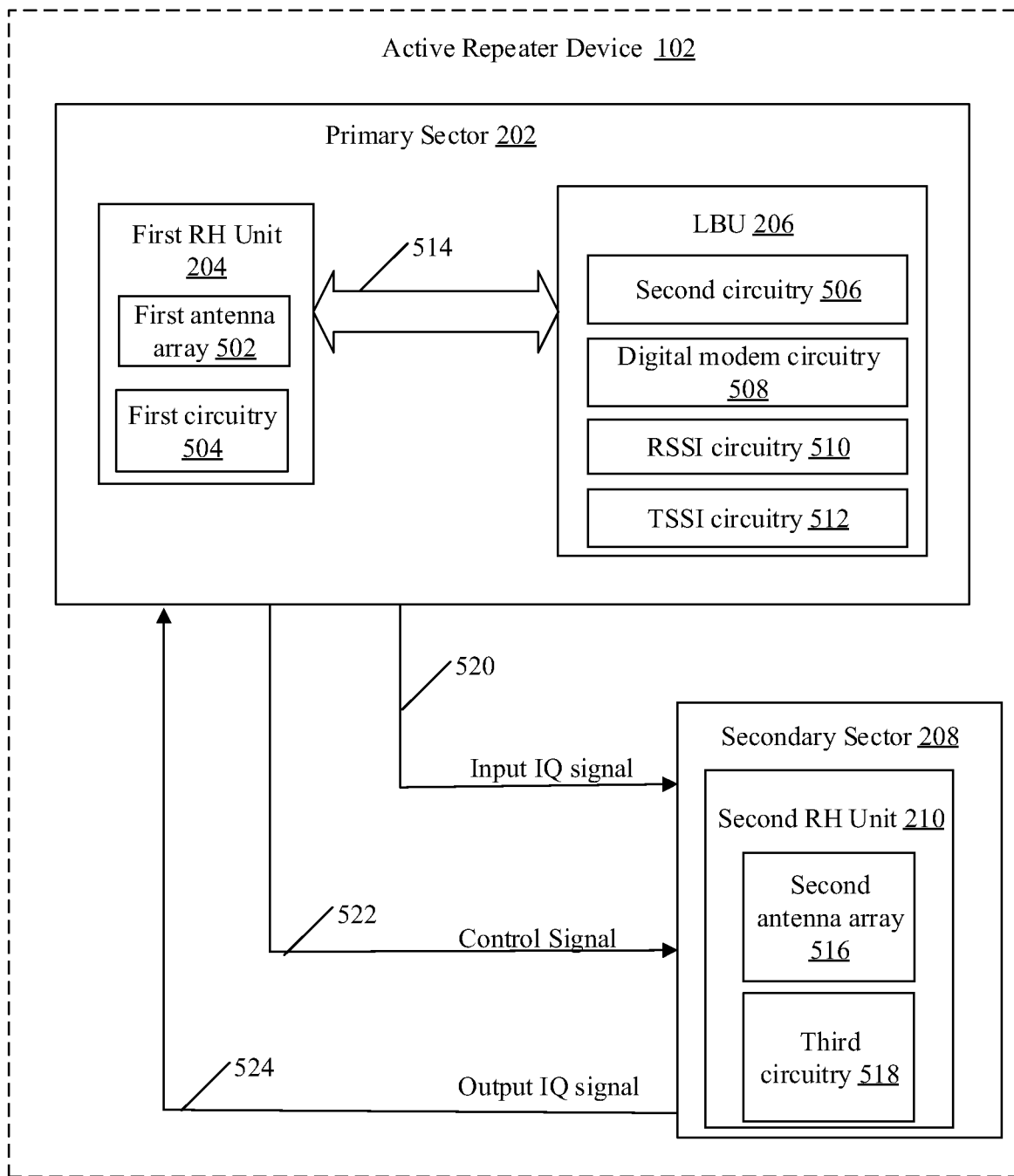
FIG. 5 depicts a block diagram illustrating various components of an exemplary active repeater device, in accordance with an exemplary embodiment of the disclosure.

In some embodiments, the first RH unit 204 may be implemented in the active repeater device 102 as a radio head (RH) card. Similarly, the baseband signal processor 206 may be implemented in the active repeater device 102 as a baseband signal processor card. Other examples of implementations of the RH card and the baseband signal processor card may include, but is not limited to an integrated circuit using a single or separate printed circuit boards (PCBs) as substrates, a radio frequency integrated chip (RFIC) or a system on a chip (SoC) device. The first RH unit 204 and the baseband signal processor 206 may be housed within the primary sector 202 of the active repeater device 102. The first RH unit 204 and the baseband signal processor 206 may be communicatively coupled with each other via a wired or wireless communication medium. An example of wired communication mediums (e.g. a control signal cable 522 and two baseband (IQ) signal cables 520 and 524) between the first RH unit 204 and the baseband signal processor 206 is shown in FIG. 5. The first RH unit 204 and the baseband signal processor 206 may communicate control signals and analog baseband (IQ) signals with each other.

Figure 2B:
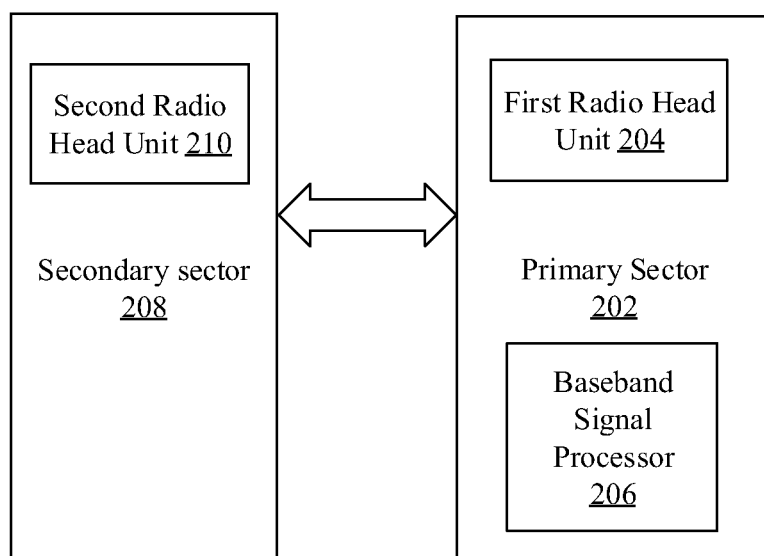
FIG. 2B is a block diagram illustrating an exemplary two-sector active repeater device, in accordance with an exemplary embodiment of the disclosure.

FIG. 2B is a block diagram illustrating an exemplary two-sector active repeater device, in accordance with an exemplary embodiment of the disclosure. FIG. 2B is explained in conjunction with elements from FIGS. 1 and 2A. With reference to FIG. 2B, there is shown a two-sector active repeater device 102 that includes the primary sector 202 of the active repeater device 102 (of FIG. 2A) and a secondary sector 208. The secondary sector 208 may include a second RH unit 210. The second RH unit 210 may be similar to the first RH unit 204. The secondary sector 208 may be communicatively coupled with the primary sector 202 via one or more signal cables (e.g. a control signal cable 522 and two baseband (IQ) signal cables 520 and 524).

Figure 2C:
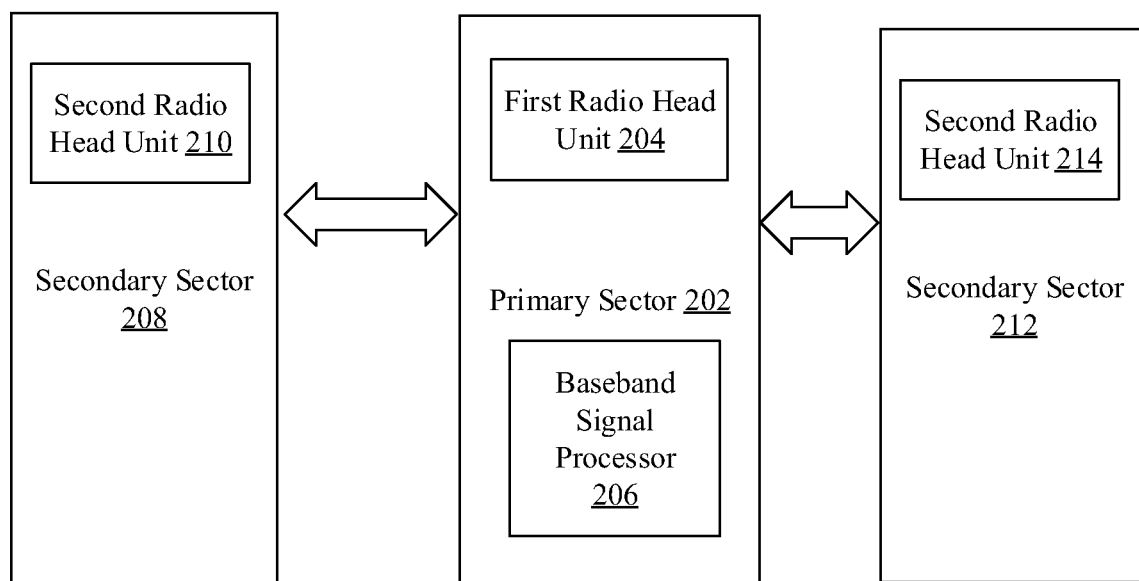
FIG. 2C is a block diagram illustrating an exemplary three-sector active repeater device, in accordance with an exemplary embodiment of the disclosure.

FIG. 2C is a block diagram illustrating an exemplary three-sector active repeater device, in accordance with an exemplary embodiment of the disclosure. FIG. 2C is explained in conjunction with elements from FIGS. 1, 2A, and 2B. With reference to FIG. 2C, there is shown a three-sector active repeater device 102 that includes an additional secondary sector, such as a secondary sector 212, connected to the two-sector active repeater device 102 of FIG. 2B. The secondary sector 212 may include a second RH unit 214 similar to the second RH unit 210. The secondary sector 212 may be communicatively coupled to the primary sector 202 via the one or more signal cables (e.g. a control signal cable 522 and two analog baseband (IQ) signal cables 520 and 524 as shown in FIG. 5). As a result of this modular architecture, the active repeater device 102 may be upgradable or re-configurable to at least one of a base station (gNB), a small cell access point, or a remote radio head (RRH). The active repeater device 102 may be upgraded to a base station, such as the gNB, by replacing the baseband signal processor 206 with a suitable baseband unit (BBU) known in the art.

The baseband signal processor 206 of the primary sector 202 of the active repeater device 102 does not process (i.e., demodulate) data stream in the received signal intended for end destination (i.e. the one or more remote UEs 106A, 106B, and 106C). The data stream may also be referred to as the data portion of the received first beam of input RF signals. The baseband signal processor 206 may decode only the header portion of the received signal to extract control information. Conventional active repeaters/relays/boosters are either simple RF amplification with no configurability. Beamforming, TDD-switching capabilities or they are full decode/recode relay nodes with a modem in the signal path and hence with a higher latency. Further, a conventional baseband unit (BBU) is voluminous, and is sometimes placed in an equipment room in mobile telecommunications systems and connected with remote radio head unit (RRU), via optical fiber. In contrast, the baseband signal processor 206 of the primary sector 202 of the active repeater device 102 may be implemented as the baseband signal processor card or chip, which is smaller in size and consumes less power in comparison with the conventional BBU. Thus, the baseband signal processor 206 may also be referred to as a light baseband unit (LBU) or a simplified baseband unit (BBU) that may be smaller in size as compared to a conventional BBU. The baseband signal processor 206 may thus be housed in the primary sector 202 of the active repeater device 102, as shown. The active repeater device 102 has a modular architecture that includes the primary sector 202, which includes the baseband signal processor 206 and the first RH unit 204. A first antenna array in the first RH unit 204 may be configured to receive a first beam of input RF signals. Thereafter, the first RH unit 204 may be configured to generate a first set of analog baseband signals based on the received first beam of input RF signals. The baseband signal processor 206 may be configured to convert the first set of analog baseband signals received from the first RH unit 204 to a first set of coded data signals. A digital modem circuitry in the baseband signal processor may be configured to extract control information from the first set of coded data signals by decoding only the header portion of the first set of coded data signals without demodulation of data portion of the first set of coded data signals. Further, the active repeater device 102 may include one or more secondary sectors (such as secondary sectors 208 and 212). Each of the one or more secondary sectors may be communicatively coupled to the primary sector 202 and includes a second RH unit (such as the RH unit 210 and 214). The second RH unit may be configured to transmit the first set of coded data signals as one or more beams of output RF signals by one or more second antenna arrays of the one or more secondary sectors to one or more remote UEs 106A, 106B, and 106C), based on the extracted control information from the first set of coded data signals. The one or more beams of output RF signals may be transmitted without demodulation of the data portion of the first set of coded data signals within the active repeater device 102 to reduce latency for transmission of the first set of coded data signals. Thus, the baseband signal processor 206 of the primary sector 202 of the active repeater device 102 does not process (i.e., demodulate) data stream in the received signal intended for end destination (i.e. the one or more remote UEs 106A, 106B, and 106C) to reduce latency in communication to the end destination without compromise in signal quality. For example, a target final Rx SNR may be achieved (i.e. signal quality at one or more remote UEs 106A, 106B, and 106C may be greater than a defined threshold SNR, for example, ~22 dB).

Figure 3:
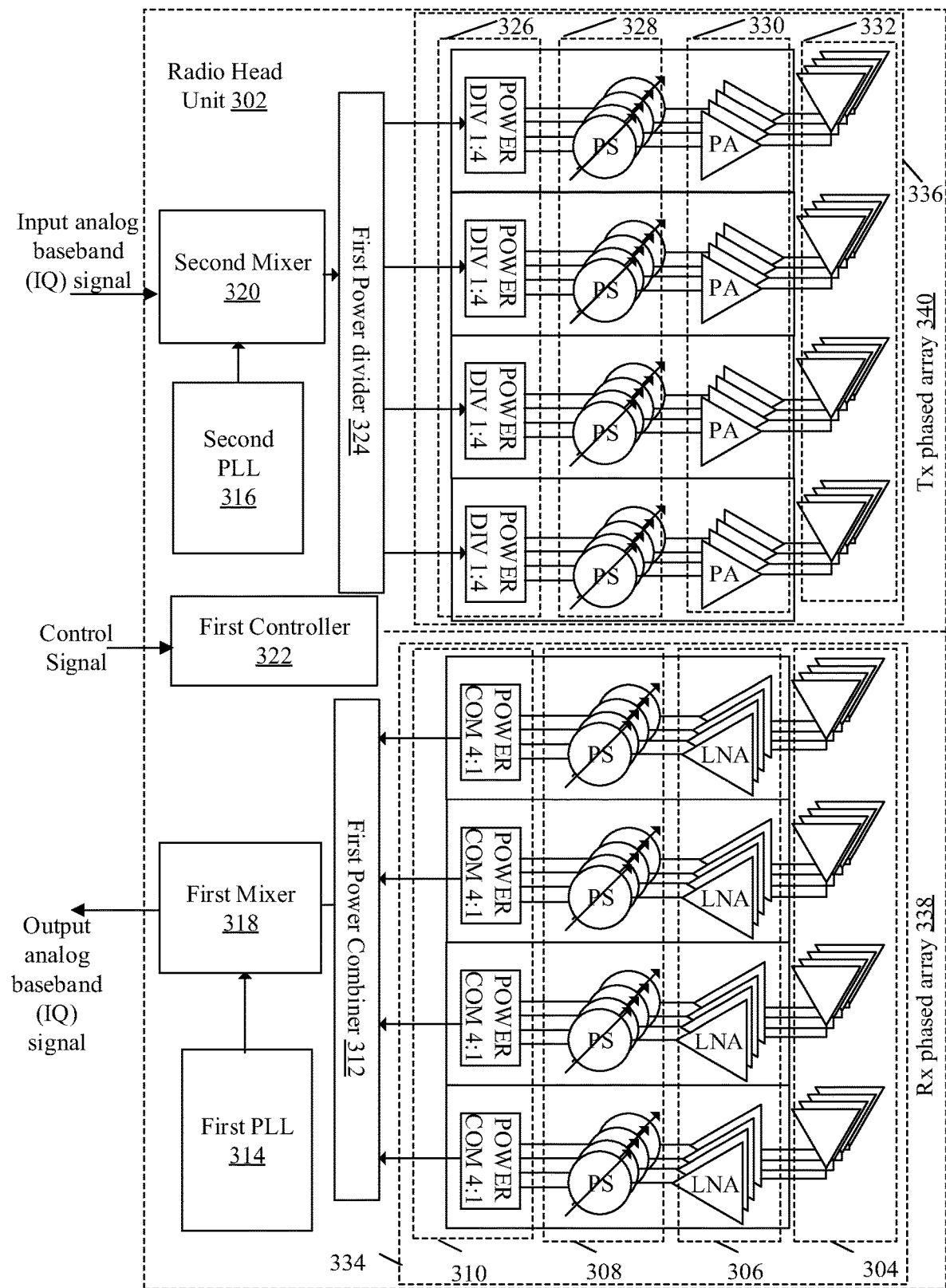
FIG. 3 depicts a circuit diagram illustrating various components of an exemplary radio head (RH) unit in the active repeater device, in accordance with an exemplary embodiment of the disclosure.

FIG. 3 depict circuit diagrams illustrating various components of an exemplary radio head unit in the active repeater device, in accordance with an exemplary embodiment of the disclosure. FIG. 3 is explained in conjunction with elements from FIGS. 1, 2A, 2B, and 2C. With reference to FIG. 3, there is shown a radio head (RH) unit 302. The RH unit 302 may be one of the first RH unit 204, the second RH unit 210, the second RH unit 214 or any other radio head units in the active repeater device 102. The RH unit 302 comprises a receiver (Rx) phased array 338 and a transmitter (TX) phased array 340. The Rx phased array 338 may include a cascading receiver chain 334 comprising a first antenna array 304, a first set of low noise amplifiers (LNA) 306, a first set of receiver front end phase shifters 308, and a first set of power combiners 310. The TX phased array 340 may include a cascading transmitter chain 336 comprising a first set of power dividers 326, a first set of transmitter front end phase shifters 328, a first set of power amplifiers (PA) 330, and a second antenna array 332. There are is also shown a first power combiner 312, a first mixer 318, a second mixer 320, a first phase locked loop (PLL) 314, a second PLL 316, a first controller 322, and a first power divider 324 in the RH unit 302.

The first antenna array 304 may be configured to receive the first beam of input RF signals from the base station 104. The first antenna array 304 may be further configured to receive one or more beams of input RF signals from the one or more remote UEs 106A, 106B, and 106C. In accordance with an embodiment, the first antenna array 304 may comprise a plurality of antenna elements. The first antenna array 304 may be configured to receive the first beam of input RF signals by use of the plurality of antenna elements. Examples of implementations of the first antenna array 304 may include, but is not limited to a linear phased array antenna, a planar phased array antenna, a frequency scanning phased array antenna, a dynamic phased array antenna. The plurality of antenna elements in the first antenna array 304 may be communicatively coupled to one or more LNAs in the first set of LNAs 306.

The first set of LNAs 306 may be configured to amplify input RF signals received at the first antenna array 304. The first set of LNAs 306 may be configured to amplify input RF signals, which may have low-power, without significantly degrading corresponding signal-to-noise (SNR) ratio. Each of the first set of LNAs 306 may be communicatively coupled to phase shifters in the first set of receiver front end phase shifters 308. The first set of receiver front end phase shifters 308 may perform an adjustment in phase values of the input RF signals, till combined signal strength value of the received input RF signals, is maximized. In one example, the first set of receiver front end phase shifters 308 may perform an adjustment in the phase values till each of the received input RF signals are in-phase with each other. Phase shifters in the first set of receiver front end phase shifters 308 may be communicatively coupled to power combiners, such as 4:1 power combiner, in the first set of power combiners 310. Further, each of the first set of power combiners 310 may be coupled to the first power combiner 312.

Each of the first set of power combiners 310 may be configured to combine each of the phase shifted input RF signals into a first set of RF signals. The first set of power combiners 310 may be configured to transmit the first set of RF signals to the first power combiner 312. The first power combiner 312 may be configured to combine the first set of RF signals to a first RF signal. The first power combiner 312 and the first set of power combiners 310 may comprise both active and passive combiners. Examples of implementation of the first power combiner 312 and the first set of power combiners 310 may include, but is not limited to resistive power combiners and solid-state power combiners. The first power combiner 312 may be further configured to communicate the first RF signal to the first mixer 318.

The first mixer 318 may be configured to down convert the first RF signal to an output analog baseband (IQ) signal. The first mixer 318 may be configured to down convert the first RF signal with a first frequency to the output analog baseband signal based on mixing of a second frequency generated by a local oscillator with the first RF signal. The first mixer 318 may be communicatively coupled with the first PLL 314. Alternatively stated, the first PLL 314 in combination with the first mixer 318 may be configured to down convert the first RF signal into the output IQ signal. The first mixer 318 may be configured to communicate the output IQ signal to the baseband signal processor 206 via a first IQ signal cable.

The second mixer 320 may be configured to receive an input analog baseband (IQ) signal from the baseband signal processor 206 via a second IQ signal cable. Further, the second mixer 320 and the second PLL 316 may be configured to up convert the received input IQ signal to a second RF signal. The second mixer 320 may be configured to up convert the input IQ signal to the second RF signal based on mixing of a third frequency generated by a local oscillator with the input IQ signal. The second mixer 320 may be communicatively coupled to the first power divider 324. Further, each of the first set of power dividers 326 may be communicatively coupled to the first power divider 324, as shown. The combination of the second mixer 320 and the second PLL 316 may be configured to transmit the second RF signal to the first power divider 324.

The first controller 322 may be configured to receive one or more control signals from the baseband signal processor 206 via a control signal cable. The first controller 322 may be configured to adjust one or more parameters (e.g., amplifier gains, and phase shifts) associated with the RX phased array 338 and the TX phased array 340 based on the received control signals. In one example, the first controller 322 may be configured to adjust amplifier gains of each of the first set of LNAs 306 and the first set of PAs 330 in the active repeater device 102. In another example, the first controller 322 may be configured to adjust phase shifts of each of the first set of transmitter front end phase shifters 328 and the first set of receiver front end phase shifters 308, based on the received control signal.

The first power divider 324 may be configured to split the second RF signal received from the second mixer 320. In one example, the first power divider 324 may comprise one or more input differential pair and two cascade pairs that may split output current into two or more branches. In another example, the first power divider 324 may further compensate for RF signal loss to achieve an efficient RF power transfer. In another example, the first power divider 324 may be configured to split the second RF signal into a second set of RF signals. The first power divider 324 may be configured to communicate the second set of RF signals into the first set of power dividers 326. The first set of power dividers 326 may be configured to further split the second set of RF signals into a plurality of RF signals. The first set of power dividers 326 may be communicatively coupled to the first set of transmitter front end phase shifters 328.

The first set of transmitter front end phase shifters 328 may be configured to receive the plurality of RF signals from the first set of power dividers 326. The first set of transmitter front end phase shifters 328 may be configured to perform a phase shift on each of the plurality of RF signals for beam forming (e.g. synthesis of a wider beam) or beam steering of the plurality of RF signals based on control information received from the baseband signal processor 206. The control information may be received by the first controller 322 and processed in conjunction with the set of transmitter front end phase shifters 328. The first set of transmitter front end phase shifters 328 may be configured to transmit the plurality of phase shifted RF signals to the first set of PAs 330.

The first set of PAs 330 may be configured to adjust an amplification gain of each of the plurality of RF signals on which phase shift has been performed by the first set of transmitter front end phase shifters 328. The amplification gain of each of the plurality of RF signals may be adjusted based on the control signal received from the first controller 322. The amplification gain of each of the plurality of RF signals may be adjusted based on the control signal received from the first controller 322. The control signal may be generated by the first controller 322 based on the one or more control signals received from the baseband signal processor 206. The first set of PAs 330 may be configured to transmit the plurality of RF signals to the second antenna array 332.

In accordance with an embodiment, the second antenna array 332 may be configured to transmit one or more beams of the plurality of output RF signals to the base station 104 (uplink communication) and/or the one or more remote UEs 106A, 106B, and 106C (downlink communication). In accordance with an embodiment, the second antenna array 332 may be a phased array antenna. The second antenna array 332 may comprise a plurality of antenna elements. The first antenna array 304 may be configured to transmit the plurality of output RF signals by use of the plurality of antenna elements. In certain scenarios, the second antenna array 332 may be configured to transmit the plurality of output RF signals to the one or more remote UEs 106A, 106B, and 106C. In other scenarios, the second antenna array 332 may be configured to transmit the plurality of output RF signals to the base station 104. Examples of implementations of the first antenna array 304 may include, but is not limited to a linear phased array antenna, a planar phased array antenna or a dynamic phased array antenna In operation, the first antenna array 304 may be configured to receive a first beam of input RF signals. The first beam of input RF signals may be received from at least one of one or more remote user equipment (UEs) or a base station in a LOS region or an NLOS region of the active repeater device 102. In one example, the first antenna array 304 may be configured to receive the first beam of input RF signals from the base station 104. In another example, the first antenna array 304 may be configured to receive the first beam of input RF signals from the one or more remote UEs 106A, 106B, and 106C. In one example, the active repeater device 102 may be configured to be activated when the first antenna array 304 receives the beam of input RF signals from the base station 104 (or another active repeater device). In such a case, the active repeater device 102 may transmit one or more output RF signals based on the received input RF signals, to the one or more remote UEs 106A, 106B, and 106C, by the second antenna array 332 of the TX phased array 340. In another example, the active repeater device 102 may be configured to be activated when the first antenna array 304 receives input RF signals from the one or more remote UEs 106A, 106B, and 106C. In such a case, the active repeater device 102 may be configured to transmit one or more output RF signals based on the received input RF signals, to the base station 104 by use of the second antenna array 332 of the TX phased array 340.

The first set of LNAs 306 in the radio head unit 302 may be configured to adjust a first amplification gain of each of the received input RF signals. The first set of receiver front end phase shifters 308 may be configured to apply a first phase shift on each of the plurality of RF signals with the adjusted first amplification gain. It may be noted that the first amplification gain of the first set of LNAs 306 may be adjusted by the first controller 322 based on the received control signal from the baseband signal processor 206. Similarly, the first phase shifts of the first set of receiver front-end phase shifters may be adjusted by the first controller 322 based on the received one or more control signals from the baseband signal processor 206.

In accordance with an embodiment, the first set of power combiners 310, and the first power combiner 312 in combination, may be configured to combine the input RF signals to generate the first RF signal. The first RF signal may be down converted by the combination of the first mixer 318 and the first PLL 314 to the output IQ signal. The output IQ signal may be communicated by the first mixer 318 to the baseband signal processor 206 via the IQ signal cable. Further, the second mixer 320 may be configured to receive the input IQ signal from the baseband signal processor 206 via the second IQ signal cable. In accordance with an embodiment, the input IQ signal may be up converted by the combination of the second mixer 320 and the second PLL 316 to a second RF signal. The first power divider 324 may be configured to split the second RF signal into a second set of RF signals. The first set of power dividers 326 may be configured to further split the second set of RF signals into a plurality of RF signals. In accordance with an embodiment, the first set of transmitter front end phase shifters 328 may be configured to perform phase shifts on each of the plurality of RF signals. Furthermore, the first set of PAs 330 may be configured to adjust an amplification gain of each of the plurality of RF signals on which phase shift has been performed by the first set of transmitter front end phase shifters 328. In accordance with an embodiment, the second antenna array 332 may be configured to transmit one or more beams of the plurality of output RF signals to the base station 104 and/or the one or more remote UEs 106A, 106B, and 106C.

Figure 4:
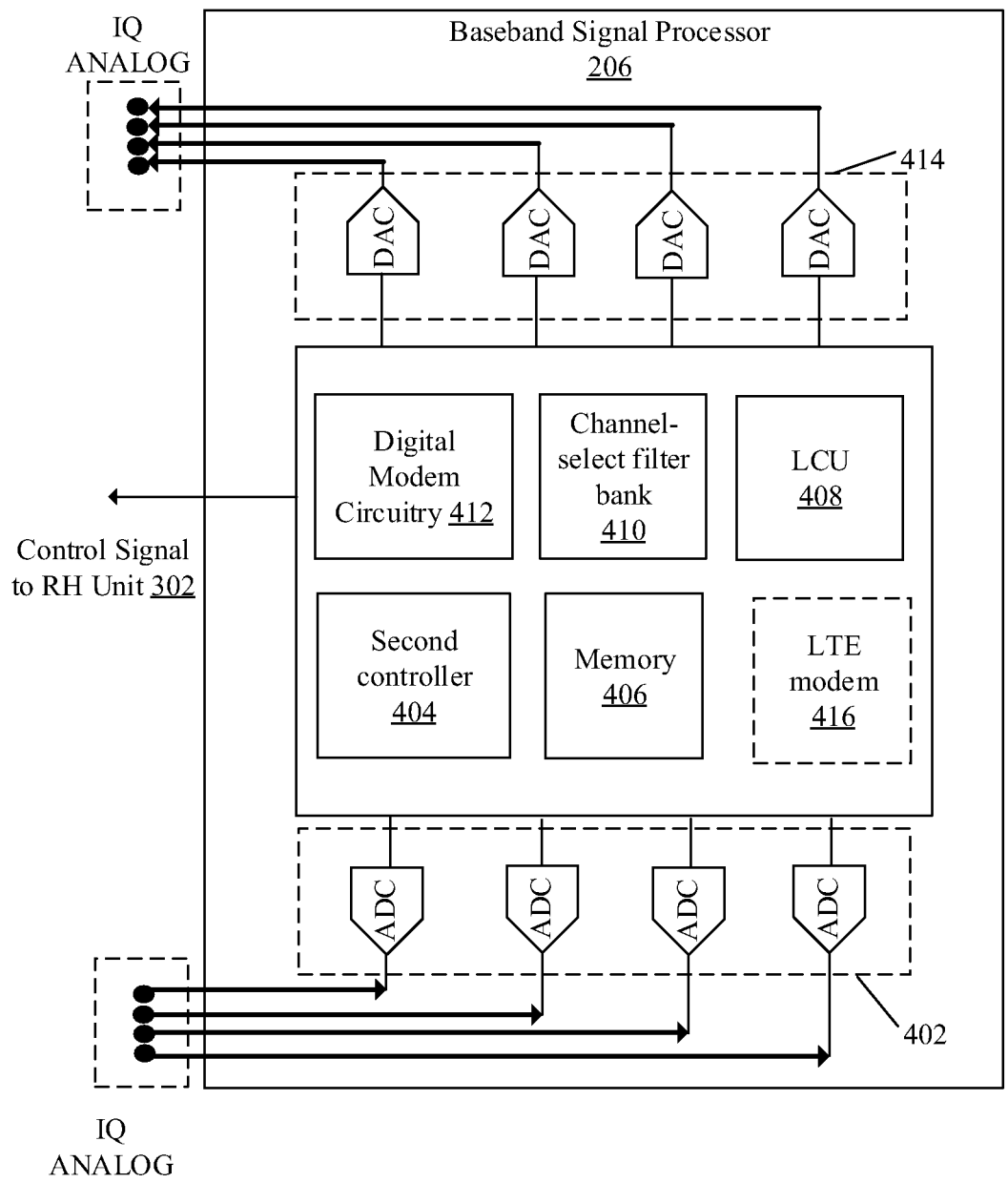
FIG. 4 depicts a block diagram illustrating various components of an exemplary baseband signal processor in the active repeater device, in accordance with an exemplary embodiment of the disclosure.

FIG. 4 depicts a block diagram illustrating various components of an exemplary baseband signal processor in the active repeater device, in accordance with an exemplary embodiment of the disclosure. FIG. 4 is explained in conjunction with elements from FIGS. 1, 2A, 2B, 2C, and 3. With reference to FIG. 4, there is shown the baseband signal processor 206. The baseband signal processor 206 comprises a first set of analog to digital converters (ADC) 402, a second controller 404, a memory 406, a transmitter-receiver control sector-to-sector routing multiplexer logic control unit (hereinafter referred to as logical control unit 408 (LCU)), a channel-select filter bank 410, a digital modem circuitry 412, and a first set of digital to analog circuitry (DAC) 414. In some embodiments, the baseband signal processor 206 may also include a Long Term Evolution (LTE) modem 416. In some embodiments, the baseband signal processor 206 may not include the LTE modem 416. The second controller 404 may be a digital signal processor. In one example, the memory 406 may store code, logic, may be correspond to one or more digital filters such as channel select filters. In another example, the channel select filters may be stored in the channel select filter bank 410.

The baseband signal processor 206 may be communicatively coupled with one or more RH units (referred to as a first set of RH units) based on the implementation of the active repeater device 102 as the one-, two-, or three-sectored active repeater device 102 as discussed in FIGS. 2A, 2B, and 2C. The baseband signal processor 206 may be communicatively coupled to the first set of RH units, such as the first RH unit 204, the second RH unit 210, and the second RH unit 214, via one or more IQ signal cables and control signal cables.

In operation, the baseband signal processor 206 may be configured to receive a first set of IQ signals (shown by arrow marks to the first set of ADCs 402) from the first set of RH units (e.g. the RH unit 302 of FIG. 3). Each IQ signal of the first set of IQ signals may be received by the baseband signal processor 206, from a corresponding RH unit of the first set of RH units. Thereafter, the first set of ADCs 402 may be configured to convert the first set of IQ signals to the first set of coded data signals. Thus, in other words, the first set of coded data signals may correspond to input RF signals received from the base station 104 and the one or more remote UEs 106A, 106B, 106C.

In accordance with an embodiment, the digital modem circuitry 412, such as the 5G digital modem, may be configured to extract control information from the first set of coded data signals. The first set of coded data signals may comprise a sequence of frames. The sequence of frames may comprise data frames and control frames. The digital modem circuitry 412 may be configured to access (or decode) the header portion of the first set of coded data signals to extract the control information. The control information may include Time Division Duplex (TDD) time slot information and beamforming information. The control information may further include frame structure and frame length information of the first set of coded data signals accessed from the header portion of the first set of coded data signals. The control information may also include the beam-management information.

In accordance with an embodiment, the second controller 404 may be configured to analyze the extracted control information to determine destination receivers for each of the first set of coded data signals. The destination receivers may be receivers of RF devices, to which the input RF signals associated with the first set of coded data signals are intended to be transmitted. Examples of such RF devices may include, but is not limited to the one or more remote UEs 106A, 106B, and 106C, the base station 104, and/or any other active repeater devices. Further, the LCU 408 may be configured to assign each of the first set of coded data signals to one or more of the first set of RH units based on the determined destination receivers.

In accordance with an embodiment, the first set of DACs 414 may be configured to convert the first set of coded data signals to a second set of IQ signals. The second set of IQ signals are analog signals. Each of the second set of IQ signals may correspond to a coded data signal of the first set of coded data signals. The baseband signal processor 206 may be configured to transmit each of the second set of IQ signals to one or more of the first set of RH units, such as the first RH unit 204, the second RH unit 210, and the second RH unit 214, based on assignment of the first set of coded data signals by the LCU 408.

In certain scenarios where the input RF signals are received from the one or more remote UEs 106A, 106B, and 106C, a first set of coded data signals may be generated similar to input RF signals received from the base station 104, as discussed. In such cases, the second controller 404 in the baseband signal processor 206 may be configured to measure a received signal strength indicator (RSSI) associated with each of the first set of coded data signals in digital domain. The RSSI is a measure of power present in a received RF signal. The RSSI may provide useful information such as rough estimate of distance between transmitters of the RF signal from the active repeater device 102.

The second controller 404 may be further configured to filter the first set of coded data signals based on one or more channel select filters in the channel-select filter bank 410. The second controller 404 may be configured to suppress adjacent channel signals in the first set of coded data signals by applying channel select filters in the channel-select filter bank 410 on the first set of coded data signals. By suppression of the adjacent channel signals in the first set of coded data signals, the second controller 404 may be configured to increase accuracy of the RSSI measurement in the digital domain.

In accordance with an embodiment, the second controller 404 may generate one or more control signals based on the extracted control information and the measured RSSI. The second controller 404 may transmit the generated one or more control signals to one or more of the first set of RH units (such as the first RH unit 204, the second RH unit 210, and the second RH unit 214). Thereafter, the one or more control signals may be received by the first controller 322 in an RH unit (such as the RH unit 302) in the first set of RH units. The first controller 322 may be configured to adjust amplification gains of the first set of LNAs 306 of the Rx phased array 338 based on the received one or more control signals from the second controller 404. Alternatively stated, the second controller 404 in association with the first controller 322 may adjust gain distribution within the cascading receiver chain 334 based on the measured RSSI. In some embodiments, the second controller 404 and the first controller 322 may be implemented as a single controller.

In accordance with an embodiment, the first controller 322 may be configured to adjust amplitude gains of the first set of PAs 330 in the cascading transmitter chain 336, based on the received one or more control signals from the second controller 404. The second controller 404 is configured to adjust transmit power of the cascading transmitter chain 336 based on the measured RSSI. By adjusting transmit power of the cascading transmitter chain 336, the second controller 404 may adjust relative power of input RF signals received from different UEs in uplink communication to the base station 104.

In accordance with an embodiment, the second controller 404 may be configured to measure a transmitter signal strength indicator (TSSI) across the first set of PAs 330 in the cascading transmitter chain 336. In accordance with an embodiment, the second controller 404 may generate the one or more control signals based on the measured TSSI. The first controller 322 may be configured to calibrate absolute transmission power levels in the cascading transmitter chain 336 based on the received one or more control signals. Therefore, the second controller 404 in association with the first controller 322, may be configured to calibrate the absolute transmission power levels in the cascading transmitter chain 336 based on the measured TSSI. In some embodiments, the LTE modem 416 may be configured to perform one or more operations, such as configuring and monitoring beamforming functions of the active repeater device 102. The LTE modem 416 may be further configured to perform timing synchronization and frequency synchronization with the base station 104 and the one or more remote UEs 106A, 106B, and 106C.

FIG. 5 depicts a block diagram illustrating various components of an exemplary two-sectored active repeater device, in accordance with an exemplary embodiment of the disclosure. FIG. 5 is explained in conjunction with elements from FIGS. 1, 2A, 2B, 2C, 3, and 4. With reference to FIG. 5, there is shown the active repeater device 102. The active repeater device 102 may be the two-sectored active repeater device that includes the primary sector 202 and the secondary sector 208. The primary sector 202 may include the first RH unit 204 and the baseband signal processor 206. The secondary sector 208 may include the second RH unit 210.

The first RH unit 204 may include a first antenna array 502 and a first circuitry 504. The first antenna array 502 may correspond to the first antenna array 304 (FIG. 3). The first circuitry 504 may comprise the first set of LNAs 306, the first set of receiver front end phase shifters 308, the first set of power combiners 310, the first power combiner 312, the first mixer 318, the first PLL 314, and the first controller 322 of FIG. 3.

The baseband signal processor 206 may comprise a second circuitry 506, a digital modem circuitry 508, an RSSI circuitry 510, and a transmitter signal strength indicator (TSSI) circuitry 512. The second circuitry 506 may comprise the first set of ADCs 402, the first set of DACs 414, the second controller 404, the memory 406, the LCU 408, and the channel-select filer bank 410. The digital modem circuitry 508 may correspond to the digital modem circuitry 412 (FIG. 4). The digital modem circuitry 508 may be the 5G digital modem circuitry that may support at least multi-band millimeter wave (mmWave) spectrum. In certain scenarios, the first RH unit 204 and the baseband signal processor 206 may be communicatively coupled via a system bus 514. The primary sector 202 may be communicatively coupled to the secondary sector 208 via a first IQ signal cable 520, a control signal cable 522, and a second IQ signal cable 524.

In operation, the first antenna array 502 of the first RH unit 204 may be configured to receive a first beam of input RF signals, for example, from the base station 104 (FIG. 1). The first circuitry 504 in the first RH unit 204 may be configured to generate the first set of IQ signals (i.e. analog baseband signals) based on the received first beam of input RF signals. The second circuitry 506 in the baseband signal processor 206 may be configured to convert the first set of IQ signals received from the first RH unit 204 to the first set of coded data signals. The digital modem circuitry 508 in the baseband signal processor 206 may be configured to extract control information from the first set of coded data signals based on header portion of the first set of coded data signals (as discussed in FIG. 4).

The second RH unit 210 may be configured to transmit the first set of coded data signals as one or more beams of output RF signals by one or more second antenna arrays (such as the second antenna array 516) of the secondary sector 208 to one or more remote UEs 106A, 106B, and 106C. The transmission may be independent of demodulation of data portion of the first set of coded data signals to reduce latency for transmission of the first set of coded data signals.

In certain scenarios, the RSSI circuitry 510 in the primary sector 202 may be configured to measure the RSSI associated with each of the first set of coded digital signals in digital domain. The second circuitry 506 (e.g. the second controller 404) may be further configured to filter the first set of coded data signals based on one or more channel select filters in the channel-select filter bank 410. The second controller 404 may be configured to suppress adjacent channel signals in the first set of coded data signals by applying channel select filters in the channel-select filter bank 410 on the first set of coded data signals. By suppression of the adjacent channel signals in the first set of coded data signals, the second controller 404 may be configured to increase accuracy of the RSSI measurement in the digital domain.

In accordance with an embodiment, the baseband signal processor 206 (e.g. the second controller 404 of the baseband signal processor 206) may be configured to generate one or more control signals based on the extracted control information and the measured RSSI. The baseband signal processor 206 (e.g. the second controller 404) may transmit the generated one or more control signals to one or more of the first set of RH units (such as the first RH unit 204, the second RH unit 210, and the second RH unit 214). The one or more control signals may be received by the first circuitry 504 (e.g. the first controller 322 in the first circuitry 504) of the first RH unit 204.

The first controller 322 of the first RH unit 204 may be configured to adjust amplification gains of the first set of LNAs 306 of the Rx phased array 338 based on the one or more control signals. Alternatively stated, the first controller 322 may adjust gain distribution within the cascading receiver chain 334 based on the measured RSSI. Further, the first controller 322 may be configured to adjust amplitude gains of the first set of PAs 330 in the cascading transmitter chain 336 based on the received one or more control signals. The first controller 322 may be further configured to adjust transmit power of the cascading transmitter chain 336 based on the measured RSSI. Further, the second controller 404, in association with the first controller 322 may adjust relative power of input RF signals received from different UEs in uplink communication to the base station 104.

In accordance with an embodiment, the TSSI circuitry 512 in the primary sector 202 may be configured to measure a TSSI across the first set of PAs 330 in the cascading transmitter chain 336. In some embodiments, the TSSI circuitry 512 may be provided in the baseband signal processor 206. In some embodiments, the TSSI circuitry 512 may be provided in the first RH unit 204. A controller, for example, the first controller 322 may calibrate the absolute transmission power levels in the cascading transmitter chain 336 based on the measured TSSI. For example, the second controller 404 may generate the one or more control signals based on the measured TSSI. The second controller 404 may be configured to communicate the one or more control signals to the first controller 322. The first controller 322 may then calibrate absolute transmission power levels in the cascading transmitter chain 336 based on the one or more control signals. Therefore, the second controller 404, in association with the first controller 322 may calibrate the absolute transmission power levels in the cascading transmitter chain 336. In some embodiments, the second controller 404 and the first controller 322 may be implemented as a single controller.

Figure 6A:
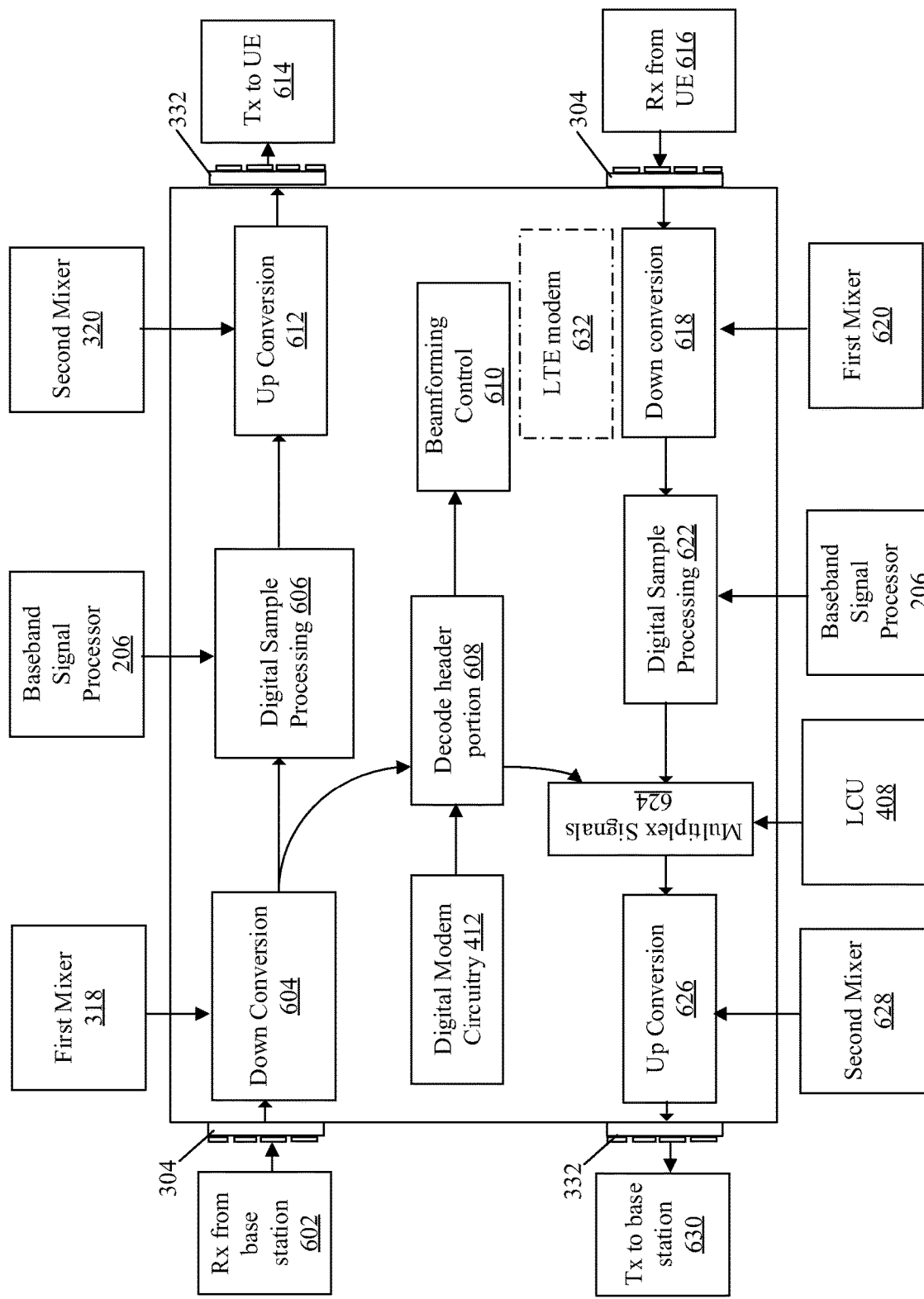
FIG. 6A illustrates exemplary operations of the active repeater device for reduction of latency, in accordance with an embodiment of the disclosure.

FIG. 6A illustrates exemplary operations of the active repeater device for reduction of latency, in accordance with an embodiment of the disclosure. With reference to FIG. 6A, there is shown the active repeater device 102. FIG. 6A is explained in conjunction with elements from FIGS. 1, 2A, 2B, 2C, 3, 4, and 5.

At 602, a first beam of input RF signals may be received from the base station 104 by the first antenna array 304 in the active repeater device 102. The cascading receiver chain 334 may be configured to combine the input RF signals into a first RF signal. The cascading receiver chain 334 may be further configured to communicate the first RF signal to the first mixer 318.

At 604, the first RF signal may be down converted by the first mixer 318 to a first analog baseband (IQ) signal. The first mixer 318 may be configured to down convert the first RF signal with a first frequency to the first IQ signal based on mixing of a second frequency generated by a local oscillator with the first RF signal. The first mixer 318 may be configured to communicate the first IQ signal to the baseband signal processor 206 via the first IQ signal cable. Similarly, the first set of RH units (such as the first RH unit 204, the second RH unit 210, and the second RH unit 214) may communicate a first set of IQ signals which includes the first IQ signal, to the baseband signal processor 206 for digital sample processing at 606.

At 606, one or more digital sample processing operations may be executed by the baseband signal processor 206. To execute the one or more digital sample processing operations, the baseband signal processor 206 may convert the first set of IQ signals into a first set of coded data signals. Examples of the one or more digital sample processing operations may include, but are not limited to RSSI measurement in digital domain, suppression of adjacent channel signals to increase accuracy of the RSSI measurement, or other sample-level manipulation of signal without incurring noticeable latency (e.g. digital pre-distortion for first set of power amplifiers 330 and digital post- or pre-gain equalization for the Rx phased array 338 or the Tx Phased array 340.) For example, a RSSI associated with each of the first set of coded digital signals may be measured by the baseband signal processor 206 in digital domain. The baseband signal processor 206 may be configured to suppress adjacent channel signals in the first set of coded data signals by applying channel select filters in the channel select filter bank 410 on the first set of coded data signals. By suppression of the adjacent channel signals in the first set of coded data signals, the second controller 404 may be configured to increase accuracy of the RSSI measurement, as discussed in FIG. 4.

At 608, control information may be extracted from the first set of coded data signals by decoding the header portion of the first set of coded data signals. The digital modem circuitry 412 may be configured to decode the header portion of frames in the first set of coded data signals to extract the control information, as discussed in FIGS. 4 and 5. The second controller 422 of the baseband signal processor 206 may generate the one or more control signals based on the measured RSSI and the extracted control information.

In some embodiments, an LTE modem, such as the LTE modem 632 may be provided. In such a case, the LTE modem 632 may be configured to configure and monitor beamforming functions of the active repeater device 102. The LTE modem 632 may be further configured to perform timing synchronization and frequency synchronization with the base station 104 and the one or more remote UEs 106A, 106B, 106C. The LTE modem 632 may correspond to the LTE modem 416 of FIG. 4.

At 610, one or more control signals may be transmitted to an RH unit (such as the RH unit 302) of the first set of RH units (such as the first RH unit 204, the second RH unit 210, and the second RH unit 214) to control beamforming at the RH unit. The one or more control signals may be received by the first controller 322 in the RH unit. The first controller 322 may be configured to adjust phase shifts of the first set of receiver front end phase shifters 308 and the first set of transmitter front end phase shifters 328, based on the one or more control signals, to control beam forming (e.g. synthesis of a wider beam) or beam steering (e.g. steering the beam in a particular direction or angle). Further, the first controller 322 may be configured to adjust amplification gains of the first set of LNAs 306 and the first set of PAs 330, based on the one or more control signals to control beamforming. The baseband signal processor 206 may further convert the first set of coded data signals to a second set of IQ signals.

At 612, the second set of IQ signals may be up converted by the combination of the second mixer 320 and the second PLL 316 to one or more output RF signals. At 614, one or more beams of output RF signals may be transmitted to the one or more remote UEs 106A, 106B, and 106C by the active repeater device 102. The transmission may be independent of (i.e. may not require) demodulation of data portion of the first set of coded data signals to reduce latency for transmission of the first set of coded data signals as the one or more beams of output RF signals.

At 616, one or more beams of input RF signals from the one or more remote UEs 106A, 106B, and 106C may be received by the first antenna array 304 in an RH unit (such as the RH unit 302) of the first set of RH units (such as the first RH unit 204, the second RH unit 210, and the second RH unit 214). The Rx phased array 338 may be configured to combine the one or more input RF signals into a third RF signal. The Rx phased array 338 may be further configured to communicate the third RF signal to a first mixer 620 in the RH unit (e.g. a RH unit of a secondary sector 208 or the secondary sector 212). The first mixer 620 may be similar to the first mixer 318 of the RH unit 302.

At 618, the third RF signal may be down converted by the first mixer 620 to a third output IQ signal. The first mixer 620 may be configured to communicate the third output IQ signal to the baseband signal processor 206 via a third IQ signal cable. Similarly, the first set of RH units (such as the first RH unit 204, the second RH unit 210, and the second RH unit 214) may communicate a third set of IQ signals to the baseband signal processor 206 of the primary sector 202.

At 622, one or more digital sample processing operations may be executed by the baseband signal processor 206 in a downlink communication. To execute the one or more digital sample processing operations, the baseband signal processor 206 may convert the third set of IQ signals into a second set of coded data signals by the baseband signal processor 206. The one or more digital sample processing operations may be similar to the operations discussed at 606. For example, the baseband signal processor 206 may be configured to measure an RSSI associated with each of the second set of coded digital signals in digital domain, as discussed in FIG. 4. Further, the baseband signal processor 206 may be configured to decode the header portion of the second set of coded data signals. The baseband signal processor 206 may be configured to determine destination receivers for each of the second set of coded data signals based on decoding of header portions of the second set of coded data signals, as discussed in FIG. 4.

At 624, each of the second set of coded data signals (that corresponds to the RF signals from the one or more remote UEs 106A, 106B, and 106C) may be multiplexed to one or more of the first set of RH units by the LCU 408, based on the determined destination receivers. Further, the first set of DACs 414 may be configured to convert the second set of coded data signals to a fourth set of IQ signals.

At 626, the fourth set of IQ signals may be up converted by a second mixer 628 in the RH unit, to a fourth RF signal. The second mixer 628 may be similar to the second mixer 320 of the RH unit 302.

At 630, a second beam of the fourth RF signal may be transmitted to the base station 104 from the second antenna array 332 (e.g. a phased antenna array of the primary sector 202) of the active repeater device 102, based on the fourth RF signal. Thus, different input RF signals from the one or more remote UEs 106A, 106B, and 106C may be received through different beam patterns and distances. The received different input RF signals from the one or more remote UEs 106A, 106B, and 106C may be superimposed by the LCU 408 under the control of the second controller 404 in primary sector 202 and transmitted to the base station 104 in uplink communication as a single stream. The single stream may include full frequency channel that corresponds to the different input RF signals received from the one or more remote UEs 106A, 106B, and 106C. The first antenna array 304 of the primary sector 202 and the one or more second antenna arrays, such as the second antenna array 332, of the one or more secondary sectors (such as the secondary sectors 208 and 212) are configured to receive the first beam of input RF signals and transmit the one or more beams of output RF signals in accordance with multiple-input multiple-output (MIMO) reception and transmission.

Figure 6B:
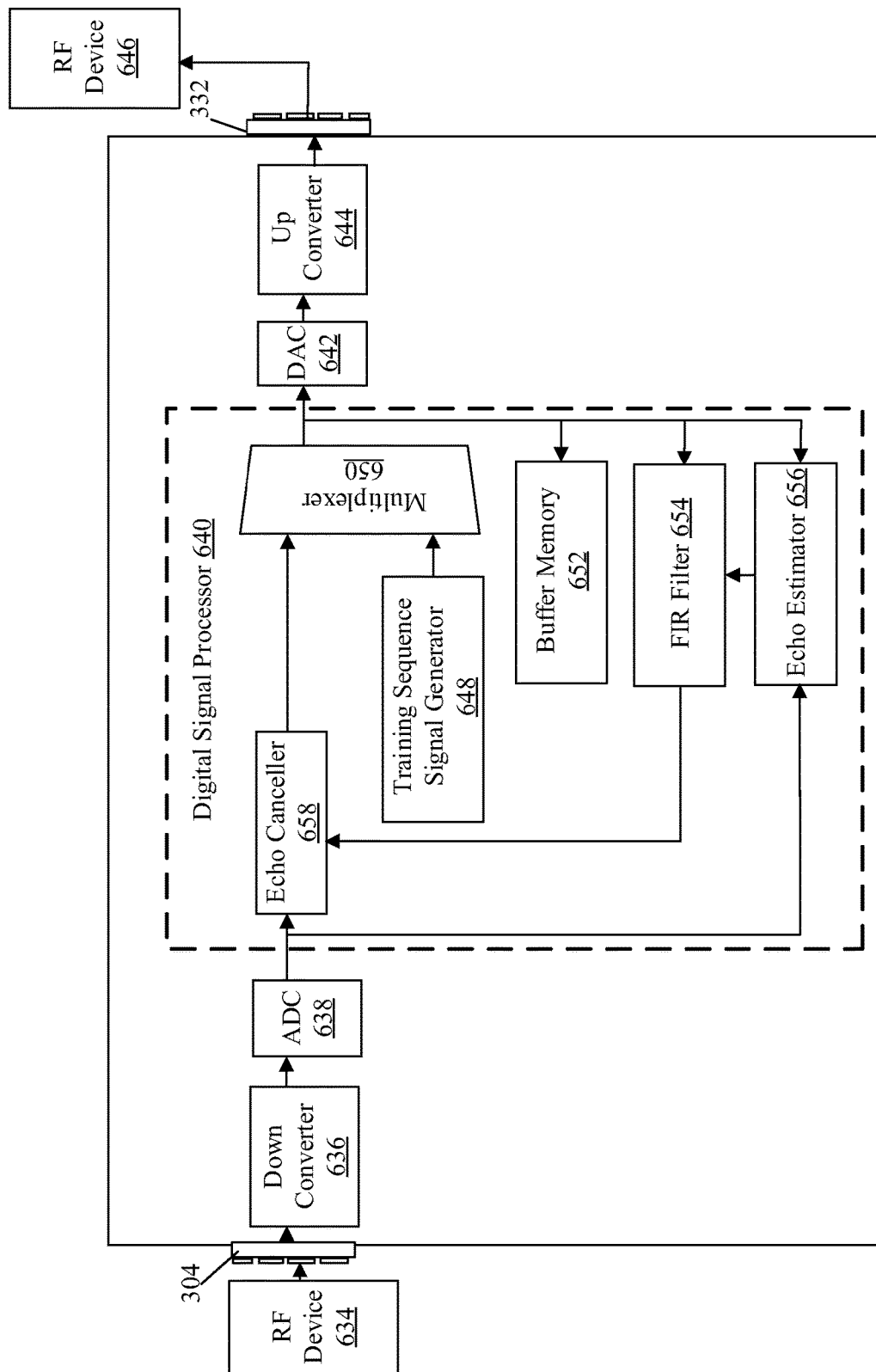
FIG. 6B is a block diagram that illustrates a digital signal processor for digital baseband domain echo channel path cancellation at a baseband receiver, in accordance with an embodiment of the disclosure.

FIG. 6B is a block diagram that illustrates a digital signal processor for digital baseband domain echo channel path cancellation at a baseband receiver, in accordance with an embodiment of the disclosure. FIG. 6B is explained in conjunction with elements from FIGS. 1, 2A, 2B, 2C, 3, 4, 5, and 6A. With reference to FIG. 6B, there is shown a block diagram of the active repeater device 102 of FIG. 1 that shows baseband RF signal processing and baseband digital signal processing between a receiver side (i.e., receiving function) and a transmitter side (i.e., transmitting function). The block diagram is shown to exemplify operations of the active repeater device 102 for cancellation of echo channel path that is caused by self-interference of RF signals transmitted by RF transmitters of the active repeater device 102.

At the receiver side, there is shown an RF device 634 coupled to the first antenna array 304, a down converter 636, and an ADC 638. There is further shown a digital signal processor 640 and at the transmitter side, a DAC 642, an up converter 644, and an RF device 646 coupled to the second antenna array 332. The digital signal processor 640 may include a training signal sequence generator 648, a multiplexer 650, a buffer memory 652, a finite impulse response (FIR) filter 654, an echo estimator 656, and an echo canceller 658. The digital signal processor 640 may correspond to the second controller 404 (FIG. 4) and digital sample processing at 622, as shown in FIG. 6A.

The digital signal processor 640 may be coupled to the ADC 638 at the receiver side and the DAC 642 at the transmitter side. The ADC 638 at the receiver side is coupled to the down converter 636 that receives RF signals from the RF device 634, via the first antenna array 304. The down converter 636 may be configured to down convert an RF signal to an analog baseband (IQ) signal. The down converter 636 may be configured to down convert the RF signal with a first frequency to the analog baseband (IQ) signal based on mixing of a second frequency generated by a local oscillator with the RF signal. The down converter 636 may be communicatively coupled with a PLL (not shown). Alternatively stated, the PLL in combination with the down converter 636 may be configured to down convert the RF signal into the baseband analog (IQ) signal. The down converter 636 may be configured to communicate the baseband analog IQ signal to the baseband signal processor 206 via a first IQ signal cable. The details of the operations of the down converter 636 and other RF processing circuitry has been described from FIGS. 1 to 6A and therefore, it has been omitted for the sake of brevity.

In the baseband signal processor 206, the ADC 638 may be configured to generate a digital baseband signal that is sampled at a defined sampling rate and further communicated to the digital signal processor 640 of the baseband signal processor 206. The digital signal processor 640 is a specialized digital computational circuitry that is configured to digitally model an echo signal at the receiver side, caused by reflection of RF signals transmitted from the transmitter side of the active repeater device 102. More specifically, the RF signals that are transmitted by at least the first RH unit 204 or the second RH unit 210 may get reflected from surroundings and may be further received back by the first RH unit 204 or the second RH unit 210 as an echo signal. The echo signal may cause self-interference with RF signals received at the receiver side of the active repeater device 102 from a base station or one or more remote UEs. Upon mixing with the RF signals at the receiver side, the echo signal may cause a decrease in a signal to noise ratio (SNR) (measured in decibels (dB)) of the RF signals that are received at the receiver side of the active repeater device 102, from a base station or one or more remote UEs.

As an example, an Orthogonal Frequency-Division Multiplexing (OFDM) signal, i.e. a digital signal received from at least the first RH unit 204 or the second RH unit 210 has a SNR of "40 dB" with respect to an input SNR for OFDM signals at transmitter side of the active repeater device 102. The SNR of "40 dB" further indicates an absence of an effect on the SNR by the echo signal that is usually received by at least the first RH unit 204 or the second RH unit 210. In terms of an error vector magnitude (EVM), the SNR of the OFDM signal may be represented by "−40 dB EVM". In presence of the echo signal at the receiver side, the SNR of the OFDM signals at the receiver side may drop down to a lower SNR, such as "19.5 dB" or "−19.5 dB EVM".

In order to remove the echo signal from the RF signals received from the base station or the one or more remote UEs, the digital signal processor 640 may be configured to estimate an echo path response that corresponds to an estimate of the echo signal received at the receiver side of the active repeater device 102. Prior to the estimation of the echo path response, the digital signal processor 102 may be configured to measure a signal quality (e.g., in terms of SNR or EVM SNR) of at least one current digital baseband signal (hereinafter, referred to as one or more current digital baseband signals) that corresponds to RF signals at the receiver side. The signal quality may indicate an effect of the echo signal on the one or more current digital baseband signals may be the digital baseband signals that are received in real time from one or more RH units, such as the first RH unit 204 and the second RH unit 210, of the active repeater device 102.

The digital signal processor 640 may be further configured to select an online mode, an offline mode, or a combination of the online mode and the offline mode for the estimation and the removal of the digital echo signal from the one or more current digital baseband signals. The selection of the online mode, the offline mode, or the combination of the online mode and the offline mode may be done based on the signal quality (i.e. the measured signal quality) of the one or more current digital baseband signals. The signal quality may correspond to an echo path response that depends on a size (in terms of FIR filter coefficients) of a digital echo signal. Alternatively stated, the selection of different modes may be done based on previously measured performance of the echo canceller 658 and/or a signal quality (e.g., in terms of SNR or EVM SNR) of the one or more current digital baseband signals.

In order to estimate the echo channel response, a reference signal, such as an OFDM pilot signal, may be required. Therefore, the training sequence signal generator 648 may be configured to generate a training sequence signal that is uncorrelated with the one or more current digital baseband signals. In the offline mode, the digital signal processor 640 may be configured to inject, only the training sequence signal as a first digital baseband signal into the multiplexer 650 of the baseband signal processor 206. The multiplexer 650 may be configured to multiplex the first digital baseband signal for transmission by at least the first RH unit 204 or the second RH unit 210, as a beam of RF signals to the one or more remote UEs or the base station.

The digital signal processor 640 may be further configured to disable a path of the one or more current digital baseband signals to the multiplexer 650 in the offline mode. In the offline mode, the feedback loop (as depicted in FIG. 6B) is disturbed when the path of the one or more current digital baseband signals is disabled. In such configuration, the operations associated with the echo cancellation can be performed under more stable system environment, i.e. with a minimal impact of the one or more current digital baseband signals on the EVM performance or SNR performance of the active repeater device 102. In certain embodiments, a periodic sanity check may be performed on the EVM or SNR performance of the echo canceller 658 of the active repeater device 102.

In the offline mode, the digital signal processor 640 may be configured to enable a path of the one or more current digital baseband signals to the multiplexer 650 in the baseband signal processor 206. Thereafter, the digital signal processor 640 may be further configured to inject the training sequence signal and the one or more current digital baseband signals as the first digital baseband signal into the multiplexer 650. The multiplexer 650 may be configured to multiplex the training sequence signal and the one or more current digital baseband signals into the first digital baseband signal for transmission by at least the first RH unit 204 or the second RH unit 210, as a beam of RF signals to the one or more remote UEs or the base station.

The digital signal processor 640 may be further configured to communicate the first digital baseband signal to the DAC 642, from where the analog baseband (IQ) signal of the first digital baseband signal is generated. The up converter 644 may be configured to receive and up convert the analog baseband (IQ) signal to an analog (IQ) signal, which may be further transmitted, by the RF device using the second antenna array 332, as a beam of radio frequency (RF) signals.

The digital signal processor 640 may be further configured to receive a second digital baseband signal that may include the first digital baseband signal and a digital echo signal. The digital echo signal may correspond to a reflection of RF signals previously transmitted by at least the first RH unit 204 or the second RH unit 210 of the active repeater device 102. In order to estimate the echo channel path, the digital signal processor 640 may implement the FIR filter 654 to model the echo channel path and the echo estimator 656 for estimation of the echo signal and adaptation of the FIR filter 654 to the estimation of the echo signal. Therefore, the digital signal processor 640 may be configured to store, in the buffer memory 652, the first digital baseband signal that may include at least the training sequence signal. The content of the digital baseband signal may depend on a mode selected for the operation of the active repeater device 102. The buffer memory 652 may be a First-In-First-Out (FIFO) buffer that may be configured to act as a buffer for storage of the first digital baseband signal such that the echo estimator may be configured to utilize the stored first digital baseband signal to estimate the echo channel path.

The FIR filter 654 may be a multi-tap FIR filter that may include a plurality of filter taps (also referred to as filter coefficients) that are adjusted based on different techniques. In accordance with an embodiment, the plurality of filter taps may be estimated based on a least mean square (LMS) technique or a least squares (LS) technique. The details of LMS or LS technique may be known to one ordinarily skilled in the art and therefore, the details of such techniques have been omitted from the disclosure for the sake of brevity.

The echo estimator 656 may be further configured to estimate a plurality of filter taps of the FIR filter 654 in the baseband signal processor 206, based on the received second digital baseband signal and the stored first digital baseband signal. More specifically, if the stored first baseband signal is represented by Y[n], the received second digital baseband signal is represented by X[n], and h[n] represents the plurality of filter taps of the FIR filter 654, then h[n] may be estimated by equation (1), as follows:

$$\min_{h[m]} E \left| X[n] - \sum_{m=0}^{m=M-1} h[m] \times Y[n-m] \right|^2 \qquad (1)$$

Where "E" represents the statistical expectation of a discrete random variable, such as X[n]. According to equation (1), the value of h[m] is adjusted till a difference between the received second digital baseband signal (X[n]) and a summation of products of a filter tap value and a delayed version of the stored first digital baseband signal for different taps of the FIR filter 654 is minimum, where "n" represents index values for samples of the stored first digital baseband signal (Y[n]) and the received second digital baseband signal (X[n]), and where "m" represents an index of a filter tap in the FIR filter 654.

In accordance with an embodiment, the plurality of filter taps may be iteratively estimated till optimal filter taps that exhibit an optimal LMS or LS value is estimated. After each iteration, the digital signal processor 640 may be configured to estimate a noise cancellation performance (measured in SNR or EVM SNR) of the active repeater device, for the one or more current digital baseband signals. The noise cancellation performance may be measured to check whether a suitable echo cancellation can be achieved at the receiver side of the active repeater device 102 with the estimated plurality of filter taps.

The digital signal processor 640 may be further configured to estimate the digital echo signal in the received second digital baseband signal based on stored first digital baseband signal and the estimated plurality of filter taps of the FIR filter. More specifically, if the digital echo signal is represented by "e[n]", the stored first digital baseband signal is represented by Y[n], and the estimated plurality of filter taps are represented by h[n], then e[n] may be estimated by equation (2), as follows:

$$e[n] = \Sigma_{m=0}^{m=M-1} h[m] \times Y[n-m] \qquad (2)$$

The noise canceller 658 may be configured to remove the estimated digital echo signal (represented by e[n]) from the one or more current digital baseband signals. The estimated digital echo signal may be removed by subtraction of the estimated digital echo signal from the one or more current digital baseband signals.

Exemplary Simulation Test Results in an Exemplary Scenario

TABLE 1

Operation State of Active Repeater Device versus EVM performance for low echo path response

| Operation State | EVM Performance |
|---|---|
| No Echo | −40.0 dB |
| With Echo, No Echo Cancellation | −19.5 dB |
| With Echo, Perfect Echo Cancellation | −40 dB |
| With Echo, Echo Cancellation (Offline Method, Training Sequence Length = 1024, No other input signal) | −40.0 dB (signal from other transmitter = 0) |
| With Echo, Echo Cancellation (Offline Method, Training Sequence, In the presence of input signal) | −25.8 dB (Training Sequence Length = 40960) −32.9 dB (Training Sequence Length = 204800) −34.9 dB (Training Sequence Length = 409600) |

TABLE 2

Operation State of Active Repeater Device versus EVM performance for medium echo path response

| Operation State | EVM Performance |
|---|---|
| No Echo | −40.0 dB |
| With Echo, No Echo Cancellation | Saturated (cannot measure) |
| With Echo, Perfect Echo Cancellation | −40 dB |
| With Echo, Echo Cancellation (Offline Method, Training Sequence Length = 1024, No other input signal) | −40.0 dB (signal from other transmitter = 0) |
| With Echo, Echo Cancellation (Offline Method, Training Sequence, In the presence of input signal) | −26.1 dB (Training Sequence Length = 40960) −32.2 dB (Training Sequence Length = 204800) −34.7 dB (Training Sequence Length = 409600) |

TABLE 3

Operation State of Active Repeater Device versus EVM performance for large echo path response

| Operation State | EVM Performance |
|---|---|
| No Echo | −40.0 dB |
| With Echo, No Echo Cancellation | Saturated (cannot measure) |
| With Echo, Perfect Echo Cancellation | −40 dB |
| With Echo, Echo Cancellation (Offline Method, Training Sequence Length = 1024, No other input signal) | −40.0 dB (signal from other transmitter = 0) |
| With Echo, Echo Cancellation (Offline Method, Training Sequence, In the presence of input signal) | −26.1 dB (Training Sequence Length = 40960) −32.4 dB (Training Sequence Length = 204800) −35.0 dB (Training Sequence Length = 409600) |

Table 1 represents an exemplary echo path response for a small size of echo signal, with a typical response of $h_e[0]=0.10$, $h_e[10]=-0.03j$, $h_e[n]=0$ for other values of n. Table 2 represents an exemplary echo path response for a medium size of echo signal, with a typical response of $h_e[0]=1.00$, $h_e[10]=0.3j$, $h_e[n]=0$ for other values of n. Table 3 represents an exemplary echo path response for a large size of echo signal, with a typical response of $h_e[0]=10.0$, $h_e[10]=3.0j$, $h_e[n]=0$ for other values of n.

Figure 7:
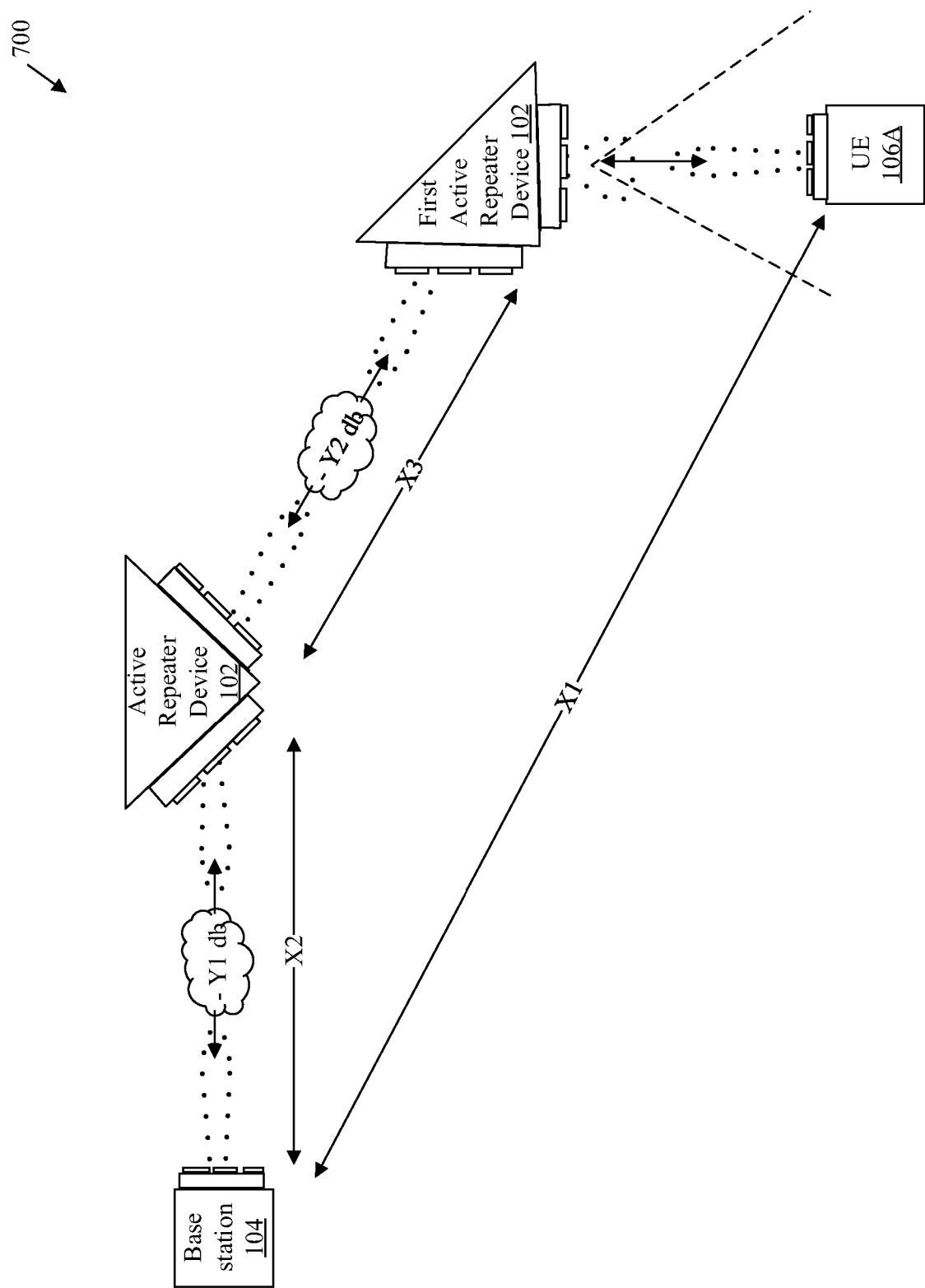
FIG. 7 depicts a block diagram illustrating a near-zero-latency multi-hop scenario using a plurality of active repeater devices, in accordance with an exemplary embodiment of the disclosure.

FIG. 7 depicts a block diagram illustrating a near-zero-latency multi-hop scenario using a plurality of active repeater devices, in accordance with an exemplary embodiment of the disclosure. FIG. 7 is explained in conjunction with elements from FIG. 1. With reference to FIG. 7, there is shown the exemplary scenario 700 comprising the active repeater device 102, the base station 104, an additional active repeater device (i.e. active repeater device 702), and the UE 106A. The active repeater device 102 and the active repeater device 702 may be deployed at certain locations in a non-line-of-sight (NLOS) transmission path between the base station 104 and the UE 106A.

In the exemplary multi-hop scenario, the active repeater device 102 (a first hop or node) may receive the first beam of input RF signals from the base station 104. The base station 104 may be "X1" distance away from the UE 106A. However, a transmission range of the base station 104 may be less than "X1". Therefore, the base station 104 may not be capable of communicating directly with the first UE 106A. In certain scenarios, the active repeater device 102 may be installed at a location which is within the transmission range of the base station 104. For example, the active repeater device 102 may be at a distance of "X2" from the base station 104. Further, the UE 106A may still not be located within the transmission range of the active repeater device 102. In such cases, the base station 104 may be configured to communicate the first beam of the input RF signals (which may be intended for the UE 106A) to the active repeater device 102. The active repeater device 102 may then transmit a second beam of output RF signals (based on the input RF signals) to another active repeater device (a second hop or node), such as the active repeater device 702. The active repeater device 702 may then transmit output RF signals via a third beam to the UE 106A. Thus, the first hop and the second hop (i.e. the active repeater devices 102 and 702) may extend the range between the base station 104, for example, an eNB, and last repeater (such as the active repeater device 702 in this case) to more than "Y" km, for example, 2 km. This may be achieved by nearly-zero latency over these hops since each node (individual active repeater device) of the NLOS transmission path do not perform demodulation and re-modulation operations, as discussed in FIGS. 1 and 4.

Figure 8:
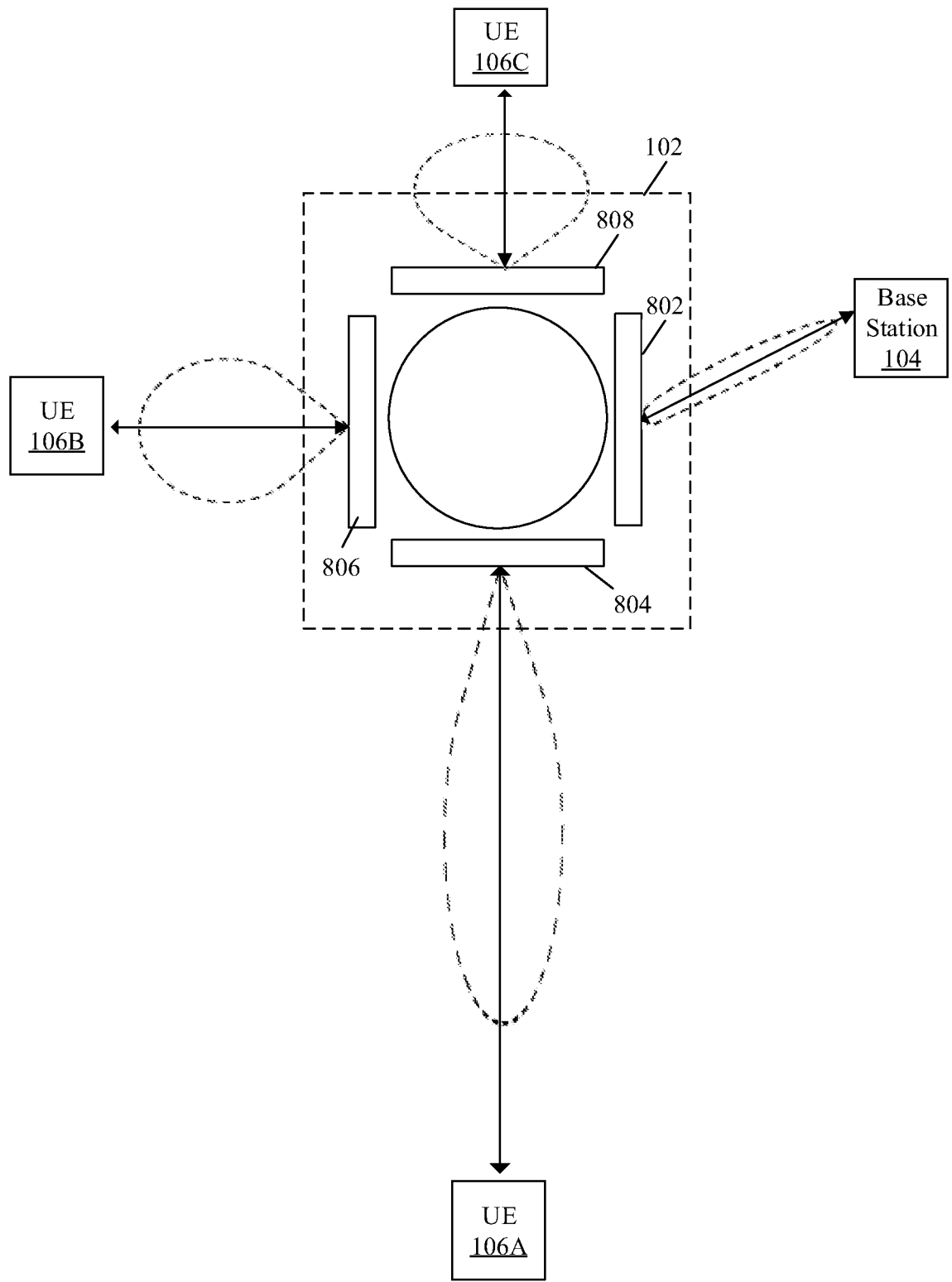
FIG. 8 illustrates an exemplary scenario for implementation of the active repeater device, in accordance with an embodiment of the disclosure.

FIG. 8 illustrates an exemplary scenario for implementation of the active repeater device, in accordance with an embodiment of the disclosure. FIG. 8 is explained in conjunction with elements from FIGS. 1, 2A, 2B, 2C, and 3 to 7. The active repeater device 102 may comprise one or more sectors, such as a primary sector 802 and one or more secondary sectors 804, 806, and 808. The primary sector 802 may correspond to the primary sector 202. The one or more secondary sectors 804, 806, and 808 may correspond to the secondary sectors 208 and 212. (FIGS. 2B and 2C).

The primary sector 802 and each of the one or more secondary sectors 804, 806, and 808, after installation at a defined location (e.g. around a post or pillar), may be configured to cover a portion of a 360-degree scan range for communication among the base station 104, the one or more remote UEs 106A, 106B, and 106C, or another repeater device. The primary sector 802 may be configured to receive a first beam of input RF signals from the base station 104. The one or more secondary sectors 804, 806, and 808 may be configured to transmit one or more beams of output RF signals to one or more remote UEs, such as the UEs 106A, 106B, and 106C independent of demodulation of data portion of the received first beam of input RF signals to reduce latency for transmission of the one or more beams of output RF signals to end destination. Alternatively stated, a digital modem circuitry (e.g. the digital modem circuitry 412 or 508) in the primary sector 802 selectively decodes only the subcarriers assigned for the consumption of the active repeater device 102 and the full received RF signal is still relayed towards the destination, such as the UEs 106A, 106B, and 106C, by the one or more secondary sectors 804, 806, and 808 without demodulation of full waveform. This is done to achieve near-zero-latency while maintaining the EVM target at end destination point (i.e. the one or more remote UEs 106A, 106B, and 106C) without relying on demodulation or re-modulation at an intermediate point, such as the deployment location of the active repeater device 102, for boosting EVM.

In accordance with an embodiment, one or more second antenna arrays of the one or more secondary sectors 804, 806, and 808 are further configured to receive different input RF signals from the one or more remote UEs 106A, 106B, and 106C through different beam patterns and distances, as shown. The received different input RF signals from the one or more remote UEs 106A, 106B, and 106C may be superimposed in the primary sector 802 and transmitted to the base station 104 in uplink communication as a single stream. The single stream includes full frequency channel that corresponds to the different input RF signals received from the one or more remote UEs 106A, 106B, and 106C, as shown.

Figure 9A:
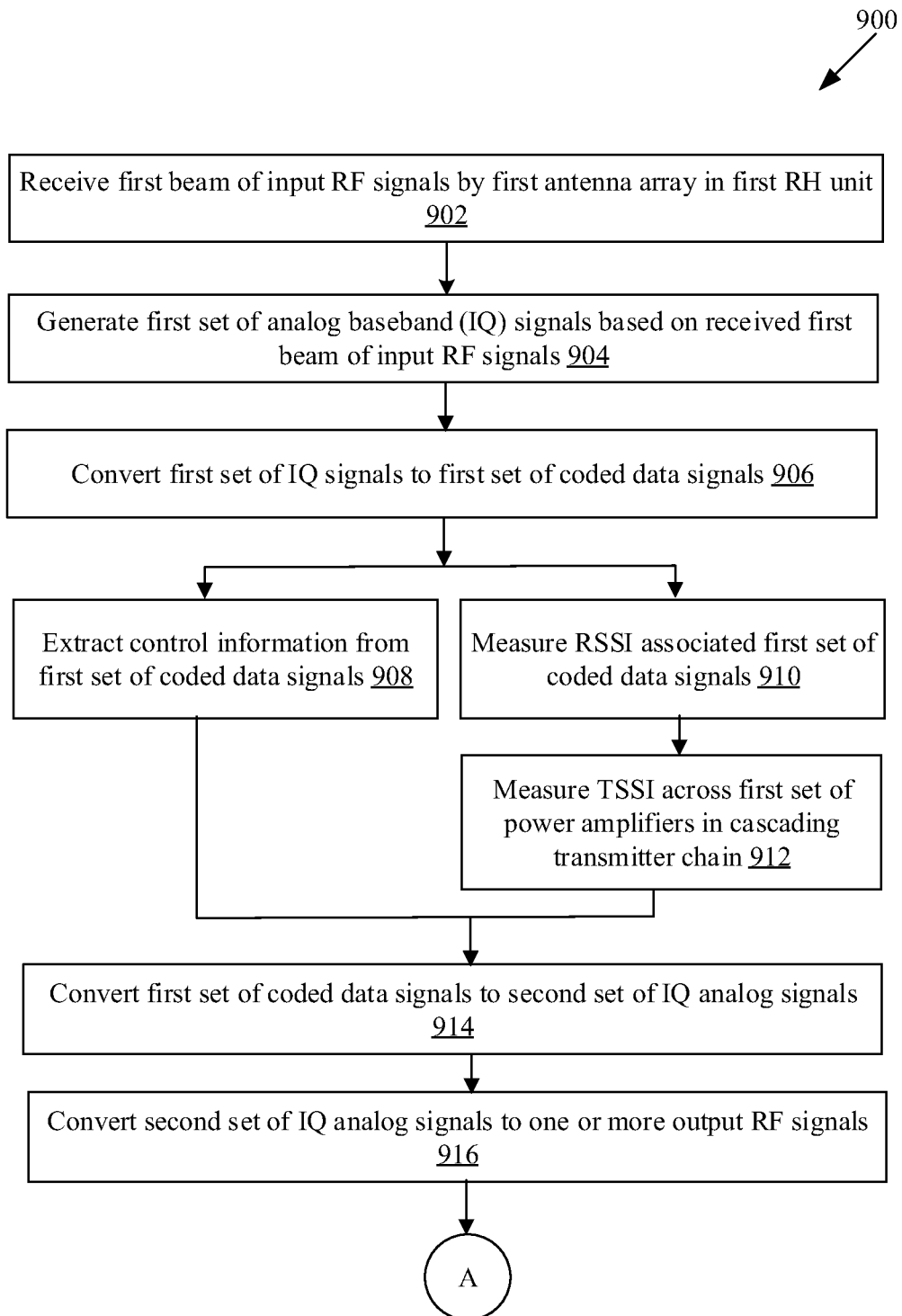
FIGS. 9A and 9B, collectively, depict a flow chart that illustrates an exemplary method of operating an active repeater device, in accordance with an embodiment of the disclosure.
Figure 9B:
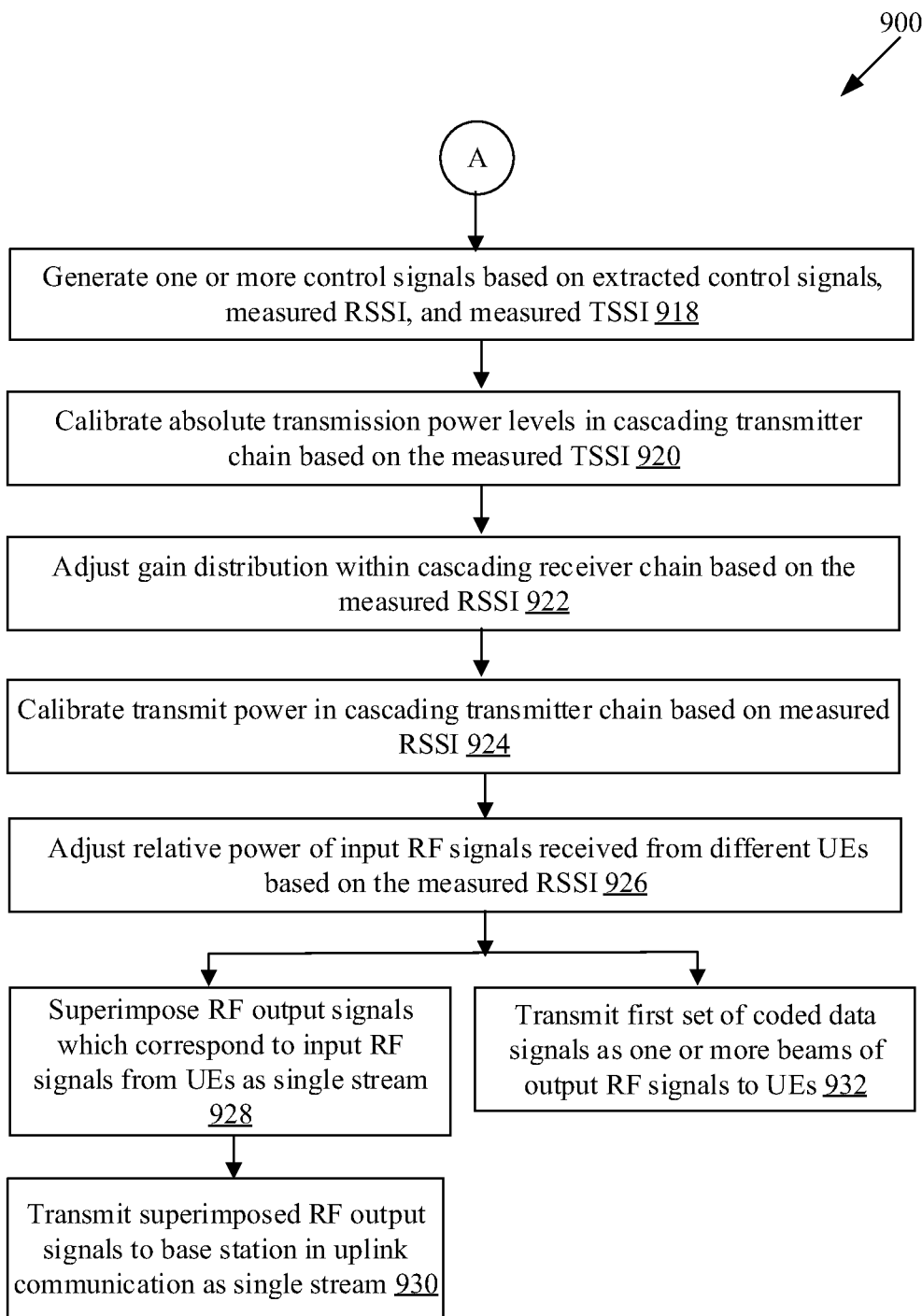

FIGS. 9A and 9B, collectively, depict a flow chart that illustrates an exemplary method of operating an active repeater device, in accordance with an embodiment of the disclosure. With reference to FIGS. 9A and 9B, there is shown a flow chart 900. The flow chart 900 is described in conjunction with FIGS. 1, 2A, 2B, 2C, and 3 to 8. Referring to FIGS. 9A and 9B, there is shown a flow chart 900 comprising exemplary operations 902 through 932.

At 902, the first beam of input RF signals may be received by a first antenna array (e.g. the first antenna array 304 or 502) in the first RH unit 204. In one example, the first beam of input RF signals may be received from the base station 104. In another example, the first beam of input RF signals may be received from a UE of the one or more remote UEs 106A, 106B, and 106C.

At 904, a first set of analog baseband (IQ) signals may be generated based on the received first beam of input RF signals. The first circuitry 504 in the first RH unit 204 may be configured to generate the first set of IQ signals. The first circuitry 504 may down convert the input RF signal to generate the first set of IQ signals. The first set of IQ signals may be received by the baseband signal processor 206 in the primary sector 202, via the first IQ signal cable 520. The first set of IQ signals may correspond to input RF signals received from the base station 104.

At 906, the first set of IQ signals received from the first RH unit 204 may be converted to the first set of coded data signals. The second circuitry 506 may comprise the first set of ADCs 402. The first set of ADCs 402 may be configured to convert the first set of IQ signals to the first set of coded data signals. One or more operations (such as 910 and 912) in the exemplary method illustrated by the flowchart 900, may be executed concurrently to 908, as shown. Therefore, the control may pass to 908 and 910.

At 908, control information may be extracted from the first set of coded data signals. In accordance with an embodiment, the active repeater device 102 may be configured to extract control information from the header portion of the first set of coded data signals. A digital modem circuitry (such as the digital modem circuitry 508 or 412) of the active repeater device 102 may be configured to decode header portion of the first set of coded data signals to extract the control information, as discussed in FIGS. 4 and 5.

At 910, RSSI associated with the first set of coded digital signals may be measured by the active repeater device 102 in digital domain. The RSSI circuitry 510 in the baseband signal processor 206 may be configured to measure the RSSI in digital domain as discussed in FIG. 5. The RSSI circuitry 510 may communicate information associated with the measured RSSI to the second controller 404 in the baseband signal processor 206. The second controller 404 in the baseband signal processor 206 may be configured to suppress adjacent channel signals in the first set of coded data signals by use of the channel select filters in the channel select filter bank 410. The accuracy of the RSSI circuitry 510 in measuring the RSSI in digital domain may be increased because of suppression of adjacent channel signals, as discussed in FIGS. 4 and 5.

At 912, TSSI across the first set of PAs 330 in the cascading transmitter chain 336 of one or more of the first set of RH units may be measured. The TSSI circuitry 512 may be configured to measure the TSSI across the first set of PAs 330 in the cascading transmitter chain 336 in the primary sector 202. The TSSI circuitry 512 may be configured to communicate information associated with the measured TSSI to the second controller 404. In accordance with an embodiment, the second controller 404 may generate the one or more control signals based on the measured TSSI.

At 914, the first set of coded data signals may be converted to a second set of IQ signals by the first set of DACs 414. The second set of IQ signals may be transmitted to one or more of the first set of the RH units communicatively coupled to the baseband signal processor 206.

At 916, the second set of IQ signals may be up converted to one or more output RF signals. The second mixer 320 may be configured to up convert the second set of IQ signals to one or more output RF signals by use of the second PLL 316.

At 918, the one or more control signals may be generated by the second controller 404 based on the extracted control information, the measured RSSI, and the TSSI. The second controller 404 may be configured to communicate the generated one or more control signals to the first controller 322 in the RH unit 302 of the primary sector 202. The first controller 322 may be configured to adjust phase shifts of the first set of receiver front end phase shifters 308 based on the one or more control signals. The first controller 322 may be configured to adjust amplitude gains of the first set of transmitter front end phase shifters 328 based on the one or more control signals. Similarly, the first controller 322 may be configured to adjust amplitude gains of the first set of LNAs 306 and the first set of PAs 330 based on the one or more control signals.

At 920, absolute transmission power levels in the cascading transmitter chain 336 may be calibrated based on the measured TSSI. The second controller 404 may generate the one or more control signals based on the measured TSSI. The first controller 322 may be configured to adjust amplitude gains of the first set of PAs 330 to calibrate the absolute transmission power levels in the cascading transmitter chain 336 based on the generated one or more control signals.

At 922, gain distribution within the cascading receiver chain 334 may be adjusted based on the measured RSSI. For example, the second controller 404 may be configured to generate the one or more control signals based on the measured RSSI and transmit the one or more control signals to the first controller 322. The first controller 322 may be configured to adjust amplitude gains of the first set of LNAs 306 based on the one or more control signals received from the second controller 404. The first controller 322 may be configured to adjust gain distribution within the cascading receiver chain 334.

At 924, transmit power in the cascading transmitter chain 336 may be calibrated based on the measured RSSI. For example, the second controller 404 may generate the one or more control signals based on the measured RSSI and transmit the control signals to the first controller 322. The first controller 322 may be configured to adjust amplitude gains of the first set of PAs 330, based on the one or more control signals, to calibrate the transmit power in the cascading transmitter chain 336.

At 926, relative power of input RF signals received from different UEs may be adjusted in uplink communication to the base station 104, based on the measured RSSI. The second controller 404 may be configured to adjust relative power of input RF signals received from different UEs, such as the one or more remote UEs 106A, 106B, and 106C, based on the measured RSSI. One or more operations (such as 928 and 930) may be executed concurrently to 932. Therefore, the control may pass to 928 and 932.

At 928, the output RF signals which may correspond to input RF signals from the one or more remote UEs 106A, 106B, and 106C, may be superimposed by the primary sector 202 as a single stream. The output RF signals may have been generated by the primary sector 202 based on the input RF signals received from the one or more remote UEs 106A, 106B, and 106C. The single stream includes full frequency channel that corresponds to the different input RF signals received from the one or more remote UEs 106A, 106B, and 106C.

At 930, the superimposed output RF signals may be transmitted to the base station 104 in uplink communication as a single stream. A phased antenna array (e.g. the second antenna array 332) of the RH unit 302 may be configured to transmit the superimposed output RF signals to the base station 104 in uplink communication as the single stream.

At 932, the first set of coded data signals may be transmitted as one or more beams of output RF signals by one or more second antenna arrays of the one or more secondary sectors (e.g. the one or more secondary sectors 804, 806, and 808) to one or more remote UEs (such as the one or more remote UEs 106A, 106B, and 106C). The one or more beams of output RF signals may be transmitted to the one or more remote UEs 106A, 106B, and 106C, based on the extracted control information from the first set of coded data signals. The transmission may be independent of demodulation of data portion of the first set of coded data signals to reduce latency for transmission of the first set of coded data signals.

Figure 10A:
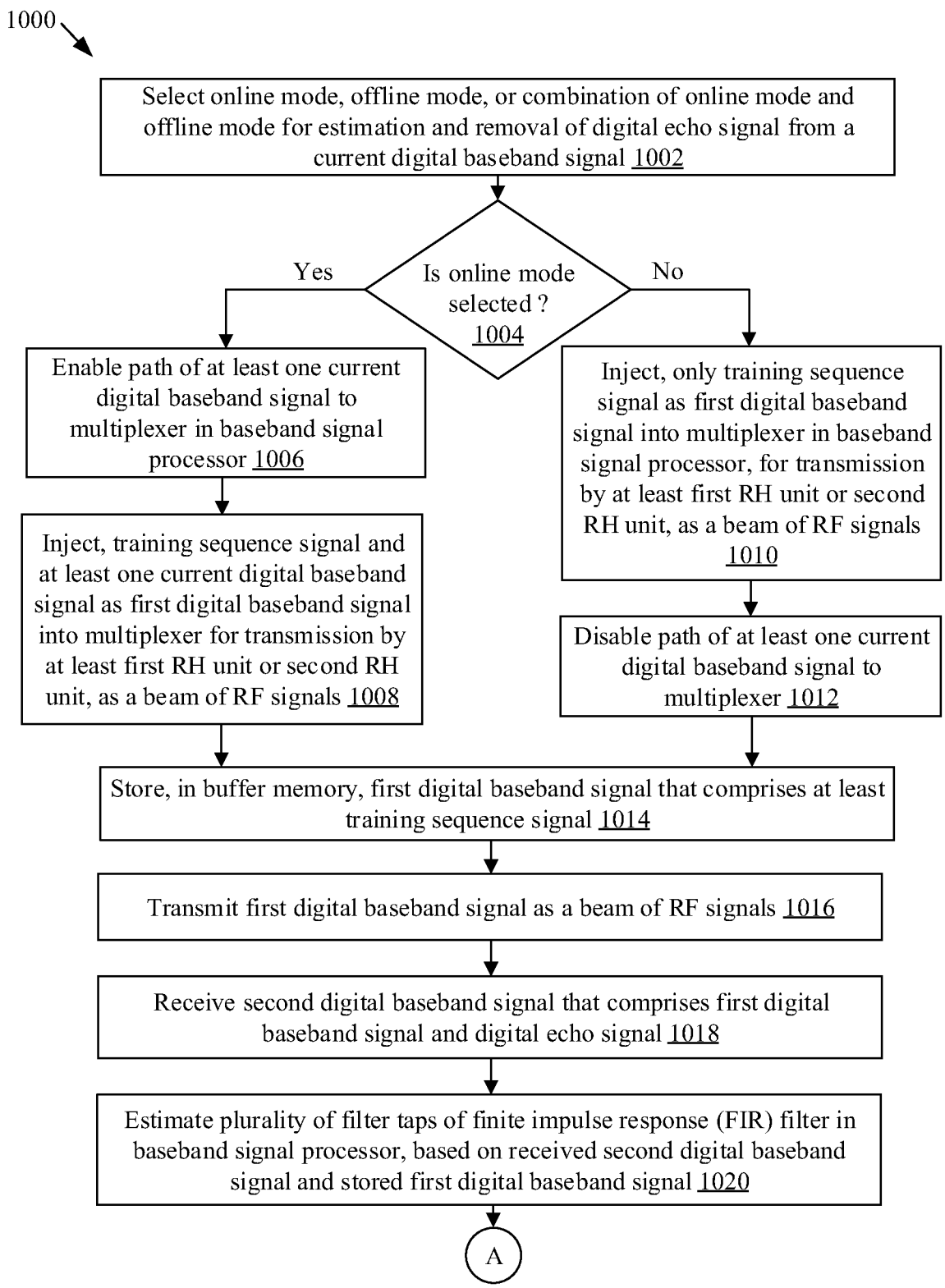
FIGS. 10A and 10B, collectively, depict a flow chart that illustrates exemplary operations for echo channel path cancellation at a baseband receiver, in accordance with an embodiment of the disclosure.
Figure 10B:
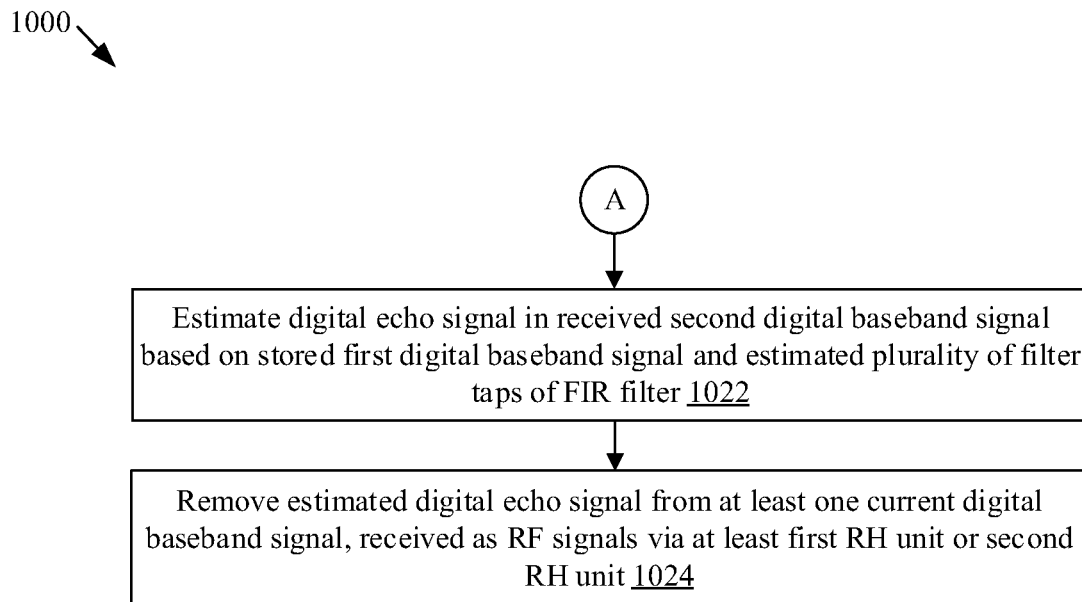

FIGS. 10A and 10B, collectively, depict a flowchart that illustrates exemplary operations for echo channel path cancellation at a baseband receiver, in accordance with an embodiment of the disclosure. FIGS. 10A and 10B are described in conjunction with FIGS. 1, 2A, 2B, 2C, and 3 to 8. With reference to FIGS. 10A and 10B, there is shown a flowchart 1000 that includes exemplary operations from 1002 to 1024.

At 1002, an online mode, an offline mode, or a combination of the online mode and the offline mode, may be selected for the estimation and removal of a digital echo signal from a current digital baseband signal. The digital signal processor 640 in the baseband signal processor 206 may be configured to select an online mode, an offline mode, or a combination of the online mode and the offline mode, for the estimation and the removal of a digital echo signal from the current digital baseband signal (as explained in FIG. 6B).

At 1004, it may be determined whether the selected mode is an online mode. The digital signal processor 640 may be configured to determine whether the selected mode is an online mode. In a case, where the selected mode is the online mode, control passes to 1006. Otherwise, control passes to 1008.

At 1006, a path of at least one current digital baseband signal to the multiplexer 650 in the baseband signal processor 206 may be enabled. The digital signal processor 640 may be configured to enable the path of at least one current digital baseband signal to the multiplexer 650 in the baseband signal processor 206.

At 1008, a training sequence signal and at least one current digital baseband signal as first digital baseband signal may be injected into the multiplexer 650 for transmission by at least the first RH unit 204 or the second RH unit 214, as a beam of RF signals. The digital signal processor 640 may be configured to inject the training sequence signal and the at least one current digital baseband signal as the first digital baseband signal into the multiplexer 650, for transmission by at least the first RH unit 204 or the second RH unit 214, as the beam of RF signals.

At 1010, the training sequence signal may be only injected as the first digital baseband signal into the multiplexer 650, for transmission by at least the first RH unit 204 or the second RH unit 214, as a beam of RF signals. The digital signal processor 640 may be configured to inject only the training sequence signal as the first digital baseband signal into the multiplexer 650, for transmission by at least the first RH unit 204 or the second RH unit 214, as a beam of RF signals.

At 1012, a path of the at least one current digital baseband signal to the multiplexer 650 may be disabled. The digital signal processor 640 may be configured to disable the path of at least one current digital baseband signal to the multiplexer 650.

At 1014, the first digital baseband signal that comprises at least the training sequence signal may be stored in the buffer memory 652. The digital signal processor 640 may be configured to store the first digital baseband signal that comprises at least the training sequence signal in the buffer memory 652.

At 1016, the first digital baseband signal may be transmitted as a beam of RF signals. The first RH unit 204 or the second RH unit 214 may be configured to transmit the first digital baseband signal as a beam of RF signals.

At 1018, a second digital baseband signal that comprises the first digital baseband signal and the digital echo signal may be received. The digital signal processor 640 may be configured to receive the second digital baseband signal that comprises the first digital baseband signal and the digital echo signal.

At 1020, a plurality of filter taps of the FIR filter 654 may be estimated in the baseband signal processor 206, based on the received second digital baseband signal and the stored first digital baseband signal. The digital signal processor 640 may be configured to estimate a plurality of filter taps of the FIR filter 654 in the baseband signal processor 206, based on the received second digital baseband signal and the stored first digital baseband signal.

At 1022, a digital echo signal may be estimated in the received second digital baseband signal based on stored first digital baseband signal and the estimated plurality of filter taps of the FIR filter 654. The digital signal processor 640 may be configured to estimate the digital echo signal in the received second digital baseband signal based on stored first digital baseband signal and the estimated plurality of filter taps of the FIR filter 654.

At 1024, the estimated digital echo signal may be removed from the at least one current digital baseband signal, received as RF signals, via at least the first RH unit 204 or the second RH unit 214. The digital signal processor 640 may be configured to remove the estimated digital echo signal from the at least one current digital baseband signal, received as RF signals, via at least the first RH unit 204 or the second RH unit 214.

When the active repeater device 102 is deployed, there may be objects in the surrounding that may cause signals to be reflected resulting in echo signals being received at the active repeater device 102. In accordance with an embodiment, an initial spatial scan may be performed to cycle through all the beams on receive and transmit side of the active repeater device 102, and initial results of the initial scan may be stored for subsequent reference. Subsequent to the initial scan, every time there is a new configuration of the beams, new scanning is performed and the amount of loopback (reflection resulting from the echo signals) may be measured and compared with the initial results of the initial spatial scan. If the comparison indicates that the amount of the loopback exceeds a certain threshold value, then the corresponding beams for the new configuration of beams may be avoided.

Various embodiments of the disclosure may provide a non-transitory computer-readable medium having stored thereon, computer implemented instruction that when executed by one or more circuits causes a device to execute operations to receive a first beam of input RF signals. A first set of analog baseband signals, are generated based on the received first beam of input RF signals. The first set of analog baseband signals are converted to a first set of coded data signals. Further, control information is extracted from the first set of coded data signals based on header portion of the first set of coded data signals. The first set of coded data signals are transmitted as beams of output RF signals to one or more remote user equipment (UEs), based on the extracted control information from the first set of coded data signals. The transmission is independent of demodulation of a data portion of the first set of coded data signals to reduce latency for transmission of the first set of coded data signals.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A device, comprising:
   a primary sector and at least one secondary sector,
   wherein the primary sector includes a digital signal processor and a first radio head (RH) unit,
   wherein the at least one secondary sector is communicatively coupled to the primary sector and the at least one secondary sector includes a second RH unit, and
   wherein the digital signal processor comprises a finite impulse response (FIR) and a buffer memory, wherein the digital signal processor is configured to:
   store, in the buffer memory, a first digital baseband signal that comprises at least a training sequence signal, wherein the first digital baseband signal is transmitted as a beam of radio frequency (RF) signals;

receive a second digital baseband signal that comprises the first digital baseband signal and a digital echo signal, wherein the digital echo signal corresponds to a reflection of RF signals previously transmitted by at least the first RH unit or the second RH unit;

estimate a plurality of filter taps of the FIR filter based on the digital echo signal in the received second digital baseband signal and the first digital baseband signal;

estimate the digital echo signal in the received second digital baseband signal based on the training sequence signal that is uncorrelated with at least one current digital baseband signal, the first digital baseband signal and the plurality of filter taps of the FIR filter; and remove the estimated digital echo signal from the at least one current digital baseband signal, wherein the at least one current digital baseband signal is received as the RF signals via at least the first RH unit or the second RH unit.

2. The device according to claim 1, the digital signal processor is further configured to select an online mode, an offline mode, or a combination of the online mode and the offline mode for the estimation of the digital echo signal and the removal of the digital echo signal from the at least one current digital baseband signal.

3. The device according to claim 2, wherein the selection of the online mode, the offline mode, or the combination of the online mode and the offline mode is based on a signal quality of the at least one current digital baseband signal, and wherein the signal quality corresponds to an echo path response that depends on a size of the digital echo signal.

4. The device according to claim 2, wherein the digital signal processor comprises a multiplexer, and the digital signal processor is configured, in the offline mode, to:

inject, the training sequence signal as the first digital baseband signal into the multiplexer;

transmit, by at least the first RH unit or the second RH unit, the training sequence signal as the beam of RF signals; and disable a path of the at least one current digital baseband signal to the multiplexer.

5. The device according to claim 2, wherein digital signal processor comprises a multiplexer, and the digital signal processor is configured, in the online mode, to:

enable a path of the at least one current digital baseband signal to the multiplexer; and inject the training sequence signal and the at least one current digital baseband signal as the first digital baseband signal into the multiplexer;

transmit, by at least the first RH unit or the second RH unit, the training sequence signal and the at least one current digital baseband signal as the beam of RF signals.

6. The device according to claim 1, wherein the plurality of filter taps are estimated based on a least mean square (LMS) technique or a least squares (LS) technique.

7. The device according to claim 1, further comprising a Received Signal Strength Indicator (RSSI) circuitry in the primary sector configured to measure RSSI of each input RF signal received from one or more remote user equipments (UEs) in digital domain, wherein an accuracy of the measurement of the RSSI in the digital domain is increased based on suppression of adjacent channel signals in the digital domain.

8. The device according to claim 1, wherein the digital signal processor is further configured to down convert the RF signal with a first frequency to an analog baseband (IQ) signal with a second frequency, and wherein the estimated digital echo signal is removed from the at least one current digital baseband signal based on the down conversion of the RF signal with the first frequency.

9. A method, comprising:

in a device comprising a primary sector and at least one secondary sector, wherein the primary sector includes a digital signal processor and a first radio head (RH) unit, wherein the at least one secondary sector is communicatively coupled to the primary sector and the at least one secondary sector includes a second RH unit, and wherein the digital signal processor comprises a finite impulse response (FIR) and a buffer memory, wherein the digital signal processor is configured to:

storing, in the buffer memory, a first digital baseband signal that comprises at least a training sequence signal, wherein the first digital baseband signal is transmitted as a beam of radio frequency (RF) signals;

receiving, by the digital signal processor, a second digital baseband signal that comprises the first digital baseband signal and a digital echo signal, wherein the digital echo signal corresponds to a reflection of RF signals previously transmitted by at least the first RH unit or the second RH unit;

estimating, by the digital signal processor, a plurality of filter taps of the FIR filter in the digital signal processor, based on the digital echo signal in the received second digital baseband signal and the first digital baseband signal;

estimating, by the digital signal processor, the digital echo signal in the received second digital baseband signal based on the training sequence signal that is uncorrelated with at least one current digital baseband signal, the first digital baseband signal and the plurality of filter taps of the FIR filter; and removing, by the digital signal processor, the estimated digital echo signal from the at least one current digital baseband signal, wherein the at least one current digital baseband signal is received as the RF signals via at least the first RH unit or the second RH unit.

10. The method according to claim 9, the digital signal processor is further configured to select an online mode, an offline mode, or a combination of the online mode and the offline mode for the estimation of the digital echo signal and the removal of the digital echo signal from the at least one current digital baseband signal.

11. The method according to claim 10, wherein the selection of the online mode, the offline mode, or the combination of the online mode and the offline mode is based on a signal quality of the at least one current digital baseband signal, and wherein the signal quality corresponds to an echo path response that depends on a size of the digital echo signal.

12. The method according to claim 10, wherein the digital signal processor comprises a multiplexer, and the digital signal processor is configured, in the offline mode, to:

inject the training sequence signal as the first digital baseband signal into the multiplexer in the digital signal processor;

transmit, by at least the first RH unit or the second RH unit, the training sequence signal as the beam of RF signals; and disable a path of the at least one current digital baseband signal to the multiplexer.

13. The method according to claim 10, wherein the digital signal processor comprises a multiplexer, and the digital signal processor is configured, in the online mode, to:

enable a path of the at least one current digital baseband signal to the multiplexer in the digital signal processor; and inject, the training sequence signal and the at least one current digital baseband signal as the first digital baseband signal into the multiplexer;

transmit, by at least the first RH unit or the second RH unit, the training sequence signal and the at least one current digital baseband signal as the beam of RF signals.

14. The method according to claim 9, wherein the plurality of filter taps are estimated based on a least mean square (LMS) technique or a least squares (LS) technique.

15. The method according to claim 9, further comprising a Received Signal Strength Indicator (RSSI) circuitry in the primary sector configured to measure RSSI of each input RF signal received from one or more remote user equipments (UEs) in digital domain, wherein an accuracy of the measurement of the RSSI in the digital domain is increased based on suppression of adjacent channel signals in the digital domain.

16. The method according to claim 9, wherein the digital signal processor is further configured to down convert the RF signal with a first frequency to an analog baseband (IQ) signal with a second frequency, and wherein the estimated digital echo signal is removed from the at least one current digital baseband signal based on the down conversion of the RF signal with the first frequency.

17. A device, comprising:

a primary sector and at least one secondary sector, wherein the primary sector includes a digital signal processor and a first radio head (RH) unit, and wherein the at least one secondary sector is communicatively coupled to the primary sector and the at least one secondary sector includes a second RH unit, wherein the digital signal processor comprises a finite impulse response (FIR) and a buffer memory, wherein the digital signal processor is configured to:

store, in the buffer memory, a first digital baseband signal that comprises at least a training sequence signal, wherein the first digital baseband signal is transmitted as a beam of radio frequency (RF) signals;

receive a second digital baseband signal that comprises the first digital baseband signal and a digital echo signal, wherein the digital echo signal corresponds to a reflection of RF signals previously transmitted by at least the first RH unit or the second RH unit;

estimate a plurality of filter taps of the FIR filter in the digital signal processor, based on the received second digital baseband signal and the first digital baseband signal;

select an online mode, an offline mode, or a combination of the online mode and the offline mode for an estimation of the digital echo signal and removal of the digital echo signal from at least one current digital baseband signal;

estimate the digital echo signal in the received second digital baseband signal based on the training sequence signal that is uncorrelated with the at least one current digital baseband signal, the first digital baseband signal and the plurality of filter taps of the FIR filter; and remove the estimated digital echo signal from the at least one current digital baseband signal, wherein the at least one current digital baseband signal is received as the RF signals via at least the first RH unit or the second RH unit.

18. The device according to claim 17, wherein the selection of the online mode, the offline mode, or the combination of the online mode and the offline mode is based on a signal quality of the at least one current digital baseband signal, and wherein the signal quality corresponds to an echo path response that depends on a size of the digital echo signal.

19. The device according to claim 17, wherein the digital signal processor comprises a multiplexer, and the digital signal processor is configured, in the offline mode, to:

inject, the training sequence signal as the first digital baseband signal into the multiplexer in the digital signal processor;

transmit, by at least the first RH unit or the second RH unit, the training sequence signal as the beam of RF signals; and disable a path of the at least one current digital baseband signal to the multiplexer.

20. The device according to claim 17, wherein the digital signal processor comprises a multiplexer, and the digital signal processor is configured, in the online mode, to:

enable a path of the at least one current digital baseband signal to the multiplexer in the digital signal processor; and inject the training sequence signal and the at least one current digital baseband signal as the first digital baseband signal into the multiplexer;

transmit, by at least the first RH unit or the second RH unit, the training sequence signal and the at least one current digital baseband signal as the beam of RF signals.

21. A device, comprising:

a primary sector and at least one secondary sector, wherein the primary sector includes a digital signal processor and a first radio head (RH) unit, and wherein the at least one secondary sector is communicatively coupled to the primary sector and the at least one secondary sector includes a second RH unit, wherein the digital signal processor comprises a finite impulse response (FIR) and a buffer memory, wherein the digital signal processor is configured to:

store, in the buffer memory, a first digital baseband signal that comprises at least a training sequence signal, wherein the first digital baseband signal is transmitted as a beam of radio frequency (RF) signals;

receive a second digital baseband signal that comprises the first digital baseband signal and a digital echo signal, wherein the digital echo signal corresponds to a reflection of RF signals previously transmitted by at least the first RH unit or the second RH unit;

estimate a plurality of filter taps of the FIR filter in the digital signal processor, based on the received second digital baseband signal and the first digital baseband signal;

estimate the digital echo signal in the received second digital baseband signal based on the training sequence signal that is uncorrelated with at least one current digital baseband signal, the first digital baseband signal and the plurality of filter taps of the FIR filter; and remove the estimated digital echo signal from the at least one current digital baseband signal, wherein the at least one current digital baseband signal is received as the RF signals via at least the first RH unit or the second RH unit.

22. A device, comprising:

a primary sector and at least one secondary sector, wherein the primary sector includes a digital signal processor and a first radio head (RH) unit, and wherein the at least one secondary sector is communicatively coupled to the primary sector and the at least one secondary sector includes a second RH unit, wherein the primary sector further includes a Received Signal Strength Indicator (RSSI) circuitry configured to measure RSSI of each input RF signal received from one or more remote user equipments (UEs) in digital domain, wherein an accuracy of the measurement of the RSSI in the digital domain is increased based on suppression of adjacent channel signals in the digital domain, and wherein the digital signal processor comprises a finite impulse response (FIR) and a buffer memory, wherein the digital signal processor is configured to:

store, in the buffer memory, a first digital baseband signal that comprises at least a training sequence signal, wherein the first digital baseband signal is transmitted as a beam of radio frequency (RF) signals;

receive a second digital baseband signal that comprises the first digital baseband signal and a digital echo signal, wherein the digital echo signal corresponds to a reflection of RF signals previously transmitted by at least the first RH unit or the second RH unit;

estimate a plurality of filter taps of the FIR filter in the digital signal processor, based on the received second digital baseband signal and the first digital baseband signal;

estimate the digital echo signal in the received second digital baseband signal based on the training sequence signal that is uncorrelated with at least one current digital baseband signal, the first digital baseband signal and the plurality of filter taps of the FIR filter; and remove the estimated digital echo signal from the at least one current digital baseband signal, wherein the at least one current digital baseband signal is received as the RF signals via at least the first RH unit or the second RH unit.

23. A method, comprising:

in an device comprising a primary sector and at least one secondary sector, wherein the primary sector includes a digital signal processor and a first radio head (RH) unit, wherein the at least one secondary sector is communicatively coupled to the primary sector and the at least one secondary sector includes a second RH unit, and wherein the digital signal processor comprises a finite impulse response (FIR) and a buffer memory, wherein the digital signal processor is configured to:

storing, in the buffer memory, a first digital baseband signal that comprises at least a training sequence signal, wherein the first digital baseband signal is transmitted as a beam of radio frequency (RF) signals;

receiving, by the digital signal processor, a second digital baseband signal that comprises the first digital baseband signal and a digital echo signal, wherein the digital echo signal corresponds to a reflection of RF signals previously transmitted by at least the first RH unit or the second RH unit;

estimating, by the digital signal processor, a plurality of filter taps of the FIR filter in the digital signal processor, based the received second digital baseband signal and the first digital baseband signal;

selecting an online mode, an offline mode, or a combination of the online mode and the offline mode for an estimation of the digital echo signal and removal of the digital echo signal from at least one current digital baseband signal;

estimating, by the digital signal processor, the digital echo signal in the received second digital baseband signal based on the training sequence signal that is uncorrelated with the at least one current digital baseband signal, the first digital baseband signal and the plurality of filter taps of the FIR filter; and removing, by the digital signal processor, the estimated digital echo signal from the at least one current digital baseband signal, wherein the at least one current digital baseband signal is received as the RF signals via at least the first RH unit or the second RH unit.

24. The method according to claim 23, wherein the selection of the online mode, the offline mode, or the combination of the online mode and the offline mode is based on a signal quality of the at least one current digital baseband signal, and wherein the signal quality corresponds to an echo path response that depends on a size of the digital echo signal.

25. The method according to claim 24, wherein the digital signal processor comprises a multiplexer, and the digital signal processor is configured, in the offline mode, to:

inject the training sequence signal as the first digital baseband signal into the multiplexer in the digital signal processor;

transmit, by at least the first RH unit or the second RH unit, the training sequence signal as the beam of RF signals; and disable a path of the at least one current digital baseband signal to the multiplexer.

26. The method according to claim 24, wherein the digital signal processor comprises a multiplexer, and the digital signal processor is configured, and the digital signal processor is configured, in the online mode, to:

enable a path of the at least one current digital baseband signal to the multiplexer in the digital signal processor; and inject, the training sequence signal and the at least one current digital baseband signal as the first digital baseband signal into the multiplexer;

transmit, by at least the first RH unit or the second RH unit, the training sequence signal and the at least one current digital baseband signal as the beam of RF signals.

27. A method, comprising:

in a device comprising a primary sector and at least one secondary sector, wherein the primary sector includes a digital signal processor and a first radio head (RH) unit, wherein the at least one secondary sector is communicatively coupled to the primary sector and the at least one secondary sector includes a second RH unit, and wherein the digital signal processor comprises a finite impulse response (FIR) and a buffer memory, wherein the digital signal processor is configured to:

storing, in the buffer memory, a first digital baseband signal that comprises at least a training sequence signal, wherein the first digital baseband signal is transmitted as a beam of radio frequency (RF) signals;

receiving, by the digital signal processor, a second digital baseband signal that comprises the first digital baseband signal and a digital echo signal, wherein the digital echo signal corresponds to a reflection of RF signals previously transmitted by at least the first RH unit or the second RH unit;

estimating, by the digital signal processor, a plurality of filter taps of the FIR filter in the digital signal processor, based the received second digital baseband signal and the first digital baseband signal;

estimating, by the digital signal processor, the digital echo signal in the received second digital baseband signal based on the training sequence signal that is uncorrelated with at least one current digital baseband signal, the first digital baseband signal and the plurality of filter taps of the FIR filter; and removing, by the digital signal processor, the estimated digital echo signal from the at least one current digital baseband signal, wherein the at least one current digital baseband signal is received as the RF signals via at least the first RH unit or the second RH unit.

28. A method, comprising:

in a device comprising a primary sector and at least one secondary sector, wherein the primary sector includes a digital signal processor, a Received Signal Strength Indicator (RSSI) circuitry and a first radio head (RH) unit, wherein the at least one secondary sector is communicatively coupled to the primary sector and the at least one secondary sector includes a second RH unit, wherein the RSSI circuitry is configured to measure RSSI of each input RF signal received from one or more remote user equipments (UEs) in digital domain, wherein an accuracy of the measurement of the RSSI in the digital domain is increased based on suppression of adjacent channel signals in the digital domain, and wherein the digital signal processor comprises a finite impulse response (FIR) and a buffer memory, wherein the digital signal processor is configured to:

storing, in the buffer memory, a first digital baseband signal that comprises at least a training sequence signal, wherein the first digital baseband signal is transmitted as a beam of radio frequency (RF) signals;

receiving, by the digital signal processor, a second digital baseband signal that comprises the first digital baseband signal and a digital echo signal, wherein the digital echo signal corresponds to a reflection of RF signals previously transmitted by at least the first RH unit or the second RH unit;

estimating, by the digital signal processor, a plurality of filter taps of the FIR filter in the digital signal processor, based the received second digital baseband signal and the first digital baseband signal;

estimating, by the digital signal processor, the digital echo signal in the received second digital baseband signal based on the training sequence signal that is uncorrelated with at least one current digital baseband signal, the first digital baseband signal and the plurality of filter taps of the FIR filter; and removing, by the digital signal processor, the estimated digital echo signal from the at least one current digital baseband signal, wherein the at least one current digital baseband signal is received as the RF signals via at least the first RH unit or the second RH unit.

\* \* \* \* \*